US012527566B2

(12) United States Patent
Hart et al.

(10) Patent No.: US 12,527,566 B2
(45) Date of Patent: Jan. 20, 2026

(54) SOFT TISSUE FIXATION SYSTEM

(71) Applicant: EndoFix Medical Technologies, Inc., Plainville, MA (US)

(72) Inventors: Rickey Hart, Wrentham, MA (US); Peter Rogal, Rochester, VT (US)

(73) Assignee: EndoFix Medical Technologies, Inc., Plainville, MA (US)

( * ) Notice: Subject to any disclaimer, the term of this patent is extended or adjusted under 35 U.S.C. 154(b) by 76 days.

(21) Appl. No.: 18/444,132

(22) Filed: Feb. 16, 2024

(65) Prior Publication Data

US 2024/0180545 A1    Jun. 6, 2024

Related U.S. Application Data

(63) Continuation-in-part of application No. 18/120,801, filed on Mar. 13, 2023, now Pat. No. 12,396,719.

(60) Provisional application No. 63/319,467, filed on Mar. 14, 2022.

(51) Int. Cl.
*A61B 17/04* (2006.01)
*A61L 17/10* (2006.01)

(52) U.S. Cl.
CPC .......... *A61B 17/0401* (2013.01); *A61L 17/10* (2013.01); *A61B 2017/0409* (2013.01)

(58) Field of Classification Search
CPC ........ A61B 17/0401; A61B 2017/0409; A61B 2017/0406; A61B 2017/0414; A61B 2017/0417; A61B 2017/0464
See application file for complete search history.

(56) References Cited

U.S. PATENT DOCUMENTS

| | | |
|---|---|---|
| 8,303,604 B2 | 11/2012 | Stone et al. |
| 9,622,738 B2 | 4/2017 | Dreyfuss et al. |
| 9,713,464 B2 | 7/2017 | Overes et al. |
| 9,737,292 B2 | 8/2017 | Sullivan et al. |
| 9,974,534 B2 | 5/2018 | Troxel et al. |
| 10,016,192 B2 | 7/2018 | Beck |
| 10,799,231 B2 | 10/2020 | Best et al. |
| 11,006,944 B2 | 5/2021 | Best et al. |

(Continued)

OTHER PUBLICATIONS

International Search Report for International Application No. PCT/US2023/015126, mailed Jul. 5, 2023, 10 pages.

(Continued)

*Primary Examiner* — Julian W Woo
(74) *Attorney, Agent, or Firm* — Nutter McClennen & Fish LLP

(57) ABSTRACT

A single delivery needle configuration accommodates multiple soft tissue fixation devices at once. The configuration eliminates the need to reload a fixation delivery device when multiple fixation devices are required. Further, this configuration can include different variations of fixation devices. In embodiments, these fixation devices are typically manufactured from standard braided polyester suture that is cut into segments with predetermined lengths. This design allows the braided suture segments to be preloaded with a suture threaded through the preloaded braided suture segments with a slip knot placed on the proximal end of a first braided suture segments (e.g., distal fixation device). The tailing suture from the slip knot passes through the second, third, fourth braided suture segments, or any required quantity of braided suture segments that have been preloaded into the delivery device. The suture passes completely through a delivery device.

9 Claims, 32 Drawing Sheets

(56) References Cited

U.S. PATENT DOCUMENTS

| | | |
|---|---|---|
| 11,154,292 B2 | 10/2021 | Meister et al. |
| 11,666,320 B2 | 6/2023 | Johnson et al. |
| 2019/0150909 A1 | 5/2019 | Stone et al. |
| 2021/0275162 A1 | 9/2021 | Mitelberg et al. |
| 2023/0056585 A1 | 2/2023 | Goncalves |
| 2023/0285015 A1 | 9/2023 | Hart et al. |
| 2024/0180545 A1 | 6/2024 | Hart et al. |

OTHER PUBLICATIONS

International Search Report for International Application No. PCT/US2025/016186, mailed Jul. 1, 2025, 12 pages.

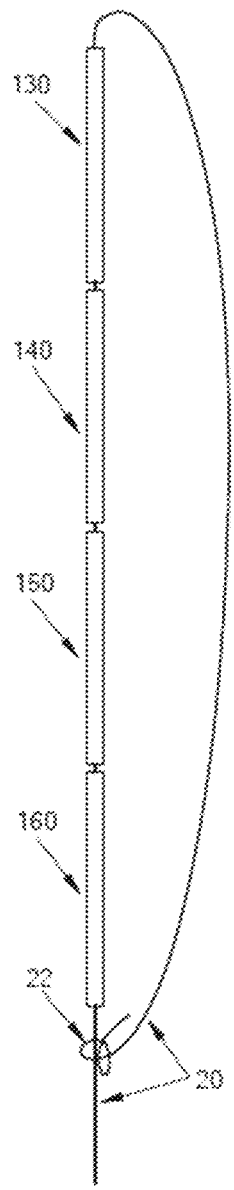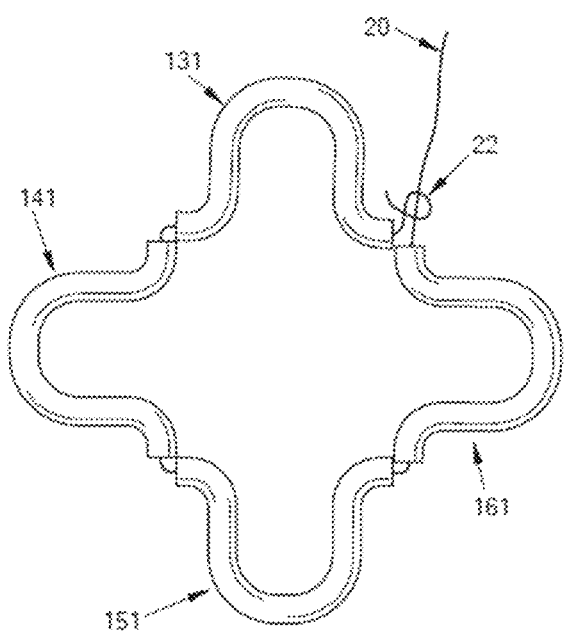
FIG. 6A
FIG. 6B

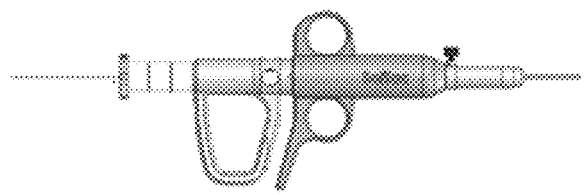
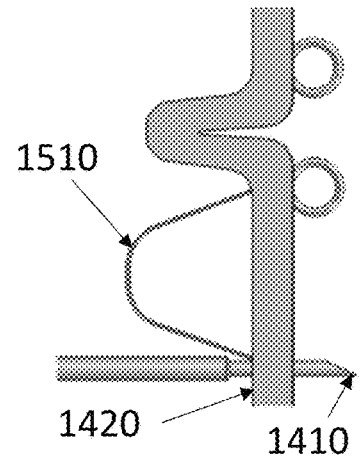
FIG. 27A
FIG. 27B
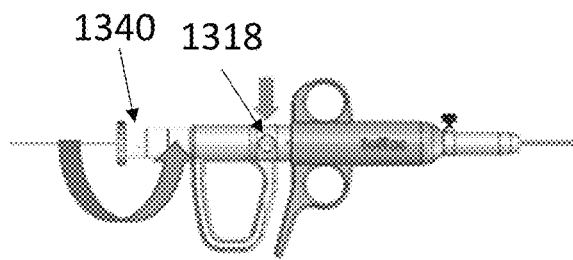
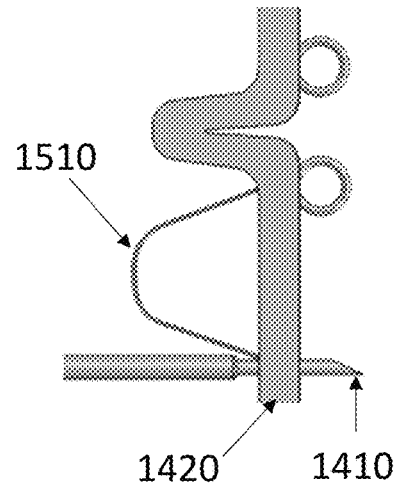
FIG. 28A
FIG. 28B

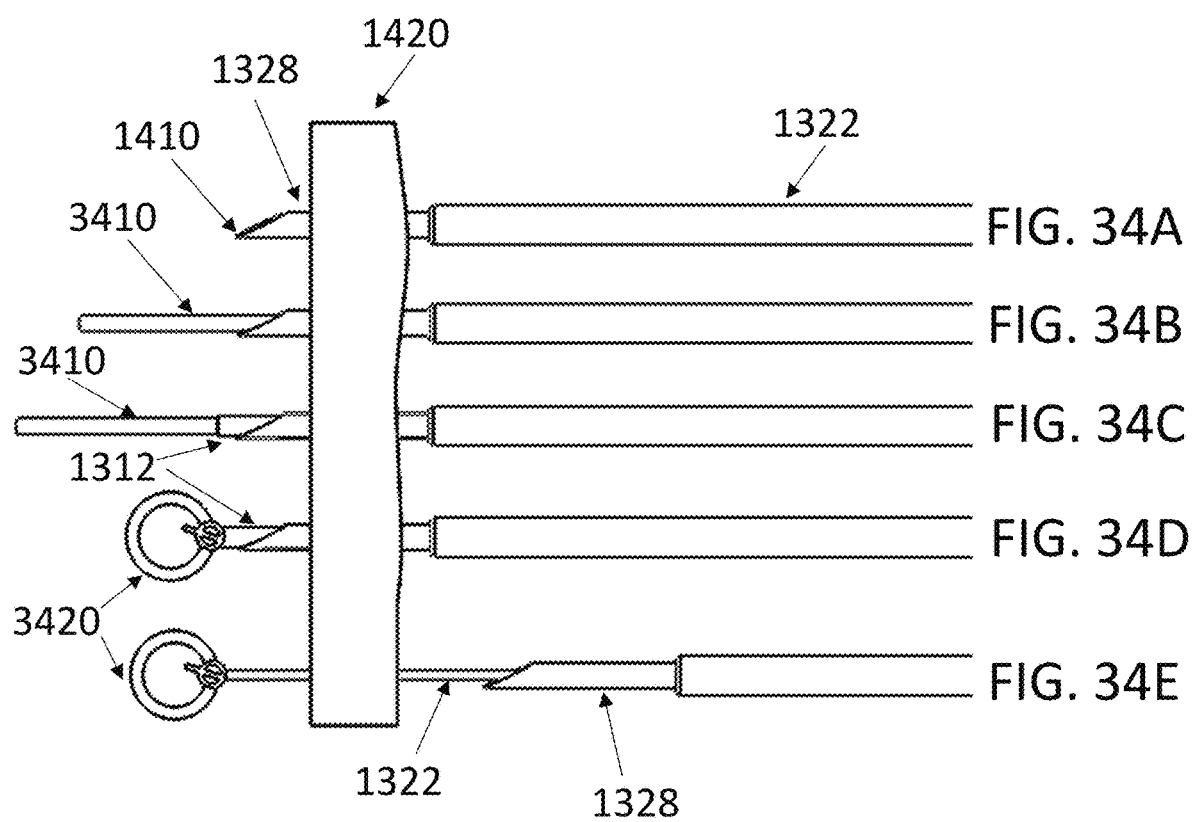

SOFT TISSUE FIXATION SYSTEM

PRIORITY

This Continuation-in-Part patent application claims priority from U.S. patent application Ser. No. 18/120,801, filed on Mar. 13, 2023, entitled, "SOFT TISSUE FIXATION SYSTEM," now U.S. Pat. No. 12,396,719, and naming Rickey Hart, Brian Tinkham, and Peter Rogal as inventors, which claims priority to provisional U.S. patent application No. 63/319,467, filed Mar. 14, 2022, entitled, "SOFT TISSUE FIXATION SYSTEM," and naming Rickey Hart, Brian Tinkham, and Peter Rogal as inventors, the disclosure of which is incorporated herein, in its entirety, by reference.

FIELD

Illustrative embodiments of the invention generally relate to surgical tissue fixation and, more particularly, various embodiments of the invention relate to devices and methods of deploying the devices to fixate tissue.

BACKGROUND

Surgical Fixation devices have primarily been manufactured from stainless, titanium, non-absorbable plastic, absorbable plastic or some hybrid of plastic and ceramic. However, the use of flexible fixation devices is far less common.

There is a particular need in medical treatment settings of fixating soft tissues, such as closing gastroenterological defects, and for that matter devices that could be used for any soft tissue to tissue approximation.

SUMMARY OF VARIOUS EMBODIMENTS

In accordance with one embodiment of the invention, a flexible braided anchor assembly for tissue fixation includes a flexible strand (e.g., suture), and a plurality of braided anchor segments slidably coupled to the flexible strand. The flexible strand passes through a bore hole that traverses from a proximal end to a distal end of each of the plurality of braided segments. The proximal end of a first braided anchor segment is adjacent to a distal end of the second braided anchor segment. The plurality of braided anchor segments are cinched together forming a flexible braided anchor assembly to provide tissue fixation.

The plurality of braided anchor segments may include straight braided suture segments that have been deformed by the application of tension on the flexible strand. The flexible strand may be a monofilament. The flexible strand may be a suture. The suture may be a braided polyester suture. Each of the plurality of braided anchor segments may be a standard braided polyester suture that is cut into predetermined lengths.

Each of the plurality of braided suture segments slidably coupled to the flexible strand may be treated to increase a rigidity of the plurality of braided suture segments slidably coupled to the flexible strand. Such a treatment may include heating each of the plurality of braided suture segments. Such a treatment may also include applying a cyanoacrylate coating to each of the plurality of braided suture segments.

The cinched plurality of braided anchor segments may have a purse string effect on the plurality of braided anchor segments such that the plurality of flexible braided anchor segments is gathered to provide tissue fixation.

In accordance with another embodiment of the invention, a method for implanting a plurality of braided suture segments connected via a single flexible strand for tissue fixation includes puncturing the tissue at a first location with a delivery needle and extruding a first braided suture segment from the delivery needle. The first braided suture segment is the first of a plurality of braided suture segments slidably coupled to a flexible strand. The flexible strand is threaded through a bore hole in the first braided suture segment.

The method further includes pulling the flexible strand a first time to deform the first braided suture segment forming the first braided anchor segment. Pulling the flexible strand the first time tightens a slipknot around a proximal end of the first braided suture segment, and tightening the slipknot is configured to anchor the first braided anchor segment to the tissue to prevent the first braided anchor segment from pulling through the tissue.

The method further includes withdrawing the delivery needle from the tissue a first time, puncturing the tissue at a second location with the delivery needle, extruding a second braided suture segment from the delivery needle, and pulling the suture a second time to deform the second braided suture segment forming the second braided anchor segment.

The method further includes withdrawing the delivery needle from the tissue a second time and pulling the suture a third time. The pulled suture causes the second anchor segment to be moved toward the first braided anchor segment.

The method further includes securing the suture to keep the tissue fixated by the plurality of braided suture segments, and cutting the suture. The suture is cut a distance away from the proximal end of a final braided anchor segment of the plurality of the braided anchor segments.

Following pulling the suture a third time, and before securing the suture, the method may further include puncturing the tissue at a third location with the delivery needle. The method may further include extruding a third braided suture segment from the delivery needle. The method may further include pulling the suture a fourth time to deform the third braided suture segment forming the third braided anchor segment. The method may further include withdrawing the delivery needle from the tissue a third time. The method may further include pulling the suture a fourth time, and the pulled suture may cause the third braided anchor segment to be moved toward the second braided anchor segment.

The first braided suture segment may be a primary first braided suture segment. Extruding the first braided suture segment may be accomplished by advancing first drive tube to push the first braided suture segment out of the delivery needle. After advancing the first drive tube to push the first braided suture segment out of the delivery needle, the first drive tube remains in an advanced position temporarily. In some embodiments, the first drive tube is also known as a compensator.

Extruding a second braided suture segment may be accomplished by advancing second drive tube to push the second braided suture segment out of the delivery needle. The second location may be between about 5 mm and about 20 mm from the first location.

Securing the suture may include a locking device or an overhead knot that can be run down to the fixation site. Securing the suture may include locking the suture in place using a locking mechanism comprising at least one of a tag, a barb, a cinch, a toggled needle, or a distal knot In accordance with yet another embodiment of the invention, a surgical device for implanting a flexible braided anchor assembly for tissue fixation includes a handle assembly. The handle assembly has a cylindrical bore passing through the handle assembly on a center axis along a length of the handle assembly.

The surgical device further includes an outer tube positioned in the cylindrical bore of the handle assembly. The outer tube is hollow and has a common center line with the cylindrical bore of the handle assembly. The outer tube includes a delivery needle having a needle tip at a distal end of the outer tube. The needle tip is a sharp point on the delivery needle.

The surgical device further includes a plurality of braided suture segments slidably coupled to a flexible strand, the flexible strand being translationally threaded through plurality of braided suture segments.

The surgical device further includes a first drive tube (e.g., compensator) positioned in the outer tube and having a common center line with the outer tube. The first drive tube is configured to extrude a first braided suture segment. In some embodiments, the first drive tube may be fabricated from a metal, such as nitinol, stainless steel, nickel, titanium, and the like. In some embodiments, the first drive tube may be fabricated from a plastic, such as polycarbonate, nylon, polyethylene, and the like. In further embodiments, the first drive tube may be fabricated from a combination of a metal and a plastic.

The surgical device further includes a second drive tube positioned in the first drive tube and having a common center line with the first drive tube. The second drive tube is configured to extrude the remaining braided suture segments of the plurality of braided suture segments. The remaining braided suture segments of the plurality of braided suture segments are translationally threaded through and pressure fit within the first drive tube. The pressure fit may be provided by a detent in the first drive tube. Each of the plurality of braided suture segments may have a hollow braided suture segment. The first drive tube protects the flexible strand and the braided suture segments from the sharp edges of the needle by being positioned outside and away from the needle.

The suture may be a monofilament strand. The plurality of braided suture segments may include a plurality of hollow braided suture segments aligned end to end having the monofilament strand threaded through the aligned plurality of hollow braided suture segments.

A column strength of the plurality of hollow braided suture segments may be increased by application of at least one of heat or a cyanoacrylate coating to each of the segments of the plurality of hollow braided suture segments.

A braided suture segment of the plurality of braided suture segments may have a length of between about 5 mm and about 50 mm. The braided suture segment of the plurality of braided suture segments may have a length of between about 5 mm and about 12 mm.

A distal end of the flexible strand threaded thru the first braided suture segment may be looped around the first braided suture segment and knotted around the flexible strand between the first braided suture segment and the first drive tube.

In accordance with another embodiment of the invention, a flexible braided anchor assembly for tissue fixation includes a flexible strand, and a plurality of flexible braided anchor segments slidably coupled to the flexible strand. The flexible strand passes through a bore hole that traverses from a proximal end to a distal end of each of the plurality of braided anchor segments, such that the proximal end of a first braided anchor segment is adjacent to a distal end of a second braided anchor segment. The plurality of braided anchor segments are cinched together forming a cinched flexible braided anchor assembly to provide tissue fixation.

Each of the plurality of braided anchor segments may include straight braided suture segments that have been deformed by application of tension on the flexible strand. The flexible strand may include a monofilament. The flexible strand comprises a suture. The suture may include a braided polyester suture. Each of the plurality of braided anchor segments may include a standard braided polyester suture that is cut into predetermined lengths.

The cinched plurality of braided anchor segments may have a purse string effect on the plurality of braided anchor segments such that the plurality of flexible braided anchor segments may be gathered to provide tissue fixation.

In accordance with another embodiment of the invention, a method for implanting a plurality of braided suture segments connected with a closure device via a single flexible strand for tissue fixation includes puncturing the tissue at a first location with a delivery needle.

The method also includes extruding a first braided suture segment from the delivery needle by squeezing together a first loop and a second loop of a closure handle assembly. The first braided suture segment is the first of a plurality of braided suture segments slidably coupled to a flexible strand. The flexible strand is threaded through a bore hole in the first braided suture segment.

The method also includes pulling the flexible strand a first time to deform the first braided suture segment forming the first suture loop track. Pulling the flexible strand the first time tightens a slipknot around a proximal end of the first braided suture segment, and tightening the slipknot is configured to anchor the first braided suture segment to the tissue to prevent the first braided suture segment from pulling through the tissue.

The method also includes withdrawing the delivery needle from the tissue a first time, puncturing the tissue at a second location with the delivery needle, and extruding a second braided suture segment from the delivery needle by advancing a third drive. Advancing the third drive utilizes an inner drive tube to push the second braided suture segment out of a nitinol inner tube.

The method also includes pulling the suture a second time to deform the second braided suture segment forming the second suture loop track, and withdrawing the delivery needle from the tissue a second time.

The method also includes pulling the suture a third time. The pulled suture causing the second suture loop track to be moved toward the first suture loop track.

The method also includes securing the suture to keep the tissue fixated by the plurality of braided suture segments, and cutting the suture. The suture is cut a distance away from the proximal end of a final suture loop track of the plurality of the suture loop tracks.

The method may further include, following pulling the suture a third time, and before securing the suture, puncturing the tissue at a third location with the delivery needle. The method may further include extruding a third braided suture segment from the delivery needle by advancing the third drive a second time. The method may further include pulling the suture a fourth time to deform the third braided suture segment forming the third suture loop track. The method may further include withdrawing the delivery needle from the tissue a third time. The method may further include pulling the suture a fourth time. The pulled suture may cause the third suture loop track to be moved toward the second suture loop track.

The first braided suture segment may be a primary first braided suture segment. The method may include squeezing together the first loop and the second loop of a closure handle assembly to advance the nitinol inner tube to push the first braided suture segment out of the delivery needle. After advancing the nitinol inner tube to push the first braided suture segment out of the delivery needle, the nitinol inner tube may remain in an advanced position temporarily.

The extruding the second braided suture segment may be accomplished by advancing nitinol drive tube to push the second braided suture segment out of the delivery needle.

The method may further include rotating the third drive, prior to extruding a second braided suture segment from the delivery needle, 90 degrees counterclockwise until it stops and shows the number 2.

The securing the suture may include a locking device or an overhead knot that can be run down to a fixation site. The securing the suture may include locking the suture in place using a locking mechanism comprising at least one of a tag, a barb, a cinch, a toggled needle, or a distel knot.

In accordance with another embodiment of the invention, a surgical device for implanting a flexible braided anchor assembly for tissue fixation includes a closure handle assembly. The closure handle assembly includes a first loop, a second loop, and a third drive.

The surgical device further includes a cylindrical bore passing through the closure handle assembly on a center axis along a length of the closure handle assembly.

The surgical device further includes a peek outer tube positioned in the cylindrical bore of the closure handle assembly. The peek outer tube is hollow and has a common center line with the cylindrical bore of the closure handle assembly. The peek outer tube includes a delivery needle having a needle tip at a distal end of the peek outer tube.

The surgical device further includes a plurality of braided suture segments slidably coupled to a flexible strand, the flexible strand being translationally threaded through plurality of braided suture segments.

The surgical device further includes a nitinol inner tube positioned in the peek outer tube and having a common center line with the peek outer tube, the nitinol inner tube configured to extrude a first braided suture segment.

The surgical device further includes an inner drive tube positioned in the nitinol inner tube and having a common center line with the nitinol inner tube. The inner drive tube is configured to extrude the remaining braided suture segments of the plurality of braided suture segments. The remaining braided suture segments of the plurality of braided suture segments are translationally threaded through and pressure fit within a detent in the inner drive tube.

Each of plurality of braided suture segments may include a hollow braided suture segment. The suture may include a monofilament strand. The plurality of braided suture segments may include a plurality of hollow braided suture segments aligned end to end having the monofilament strand threaded through the aligned plurality of hollow braided suture segments.

A column strength of the plurality of hollow braided suture segments may be increased by application of at least one of heat or a cyanoacrylate coating to each of the segments of the plurality of hollow braided suture segments.

A braided suture segment of the plurality of braided suture segments may have a length of between about 5 mm and about 50 mm. Each of the braided suture segments of the plurality of braided suture segments may have a length of between about 5 mm and about 12 mm.

A distal end of the flexible strand threaded thru the first braided suture segment may be looped around the first braided suture segment and knotted around the flexible strand between the first braided suture segment and the first drive tube.

Each of the plurality of braided suture segments may be treated to increase a rigidity of the plurality of braided suture segments slidably coupled to the flexible strand. The treatment may include heating each of the plurality of braided suture segments, or the treatment may include applying a cyanoacrylate coating to each of the plurality of braided suture segments.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 6A shows yet another embodiment of a braided suture segment.

FIG. 6B shows yet another embodiment of a braided suture segment.

FIG. 27A shows a side view of another embodiment of the closure device after approximating the needle in accordance with the present disclosure.

FIG. 27B shows a schematic cross section illustration of a closure device with the needle after puncturing the tissue in a third location.

FIG. 28A shows a side view of another embodiment of the closure device being with the back plunger being rotated 90 degrees until stopping with the number "3" showing in a window in accordance with the present disclosure package.

FIG. 28B shows a schematic cross section illustration of a closure device with the needle after puncturing the tissue in a third location.

FIG. 34A shows an embodiment of a needle piercing a tissue in accordance with the present disclosure.

FIG. 34B shows an embodiment of a first implant being advanced from a needle by squeezing a handle of a closure device in accordance with the present disclosure.

FIG. 34C shows an embodiment of exposing a compensator from a needle by squeezing a handle of a closure device a second time and holding it closed in accordance with the present disclosure.

FIG. 34D shows an embodiment of pulling a suture taut and deforming the implant by continuing to hold the handle closed and pulling the handle.

FIG. 34E shows an embodiment of removing the needle from the tissue by relaxing the handle and having the compensator retract into the needle.

DESCRIPTION OF ILLUSTRATIVE EMBODIMENTS

Figure 1A:
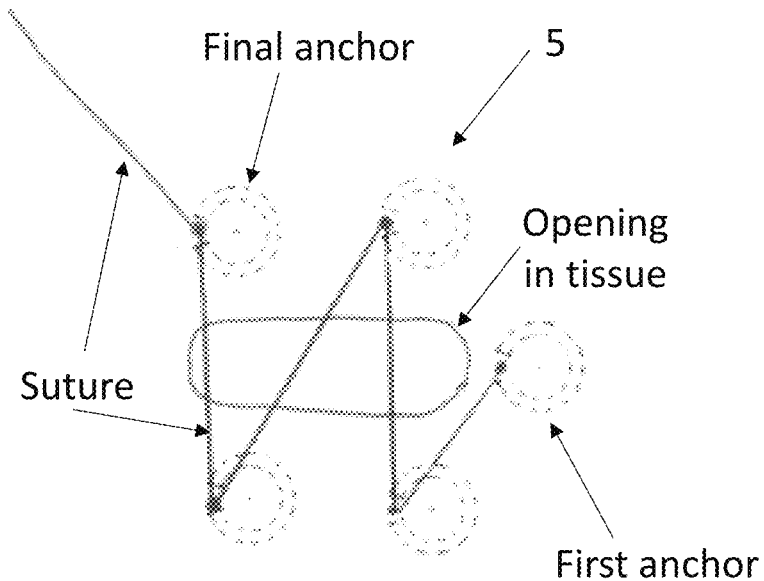
FIG. 1A shows a schematic plan view of a flexible braided anchor assembly for tissue fixation according to one embodiment of the present disclosure before cinching the suture tight.

The present disclosure includes a single delivery needle configuration which can accompany multiple soft tissue fixation devices at once. The device addresses tissue to tissue fixation. The configuration eliminates the need to reload a fixation delivery device when multiple fixation devices are required. Further, this configuration can include different variations of devices via: length; diameter; connectivity; function; and deployment. In embodiments, these presently disclosed fixation devices are typically manufactured from standard braided polyester suture that is cut into predetermined lengths.

This design would be preloaded with either a monofilament or a braided type suture with a slip knot placed on the proximal end of the distal fixation device. The tailing suture from the slip knot will pass through the second, third, fourth fixation devices, or any required quantity of fixation devices. The suture will then pass completely through the delivery device where it can be coiled and placed onto a card for storage. Details of illustrative embodiments are discussed below.

To deploy the fixation devices, a series of internal tubes are required. A needle tip would first pierce a tissue and the distal fixation device would be pushed out of the delivery needle via a first tube. This tube will then lock in place inside the handle mechanism and will have further movement and used to house the remaining fixation devices. The delivery needle is then removed from the tissue and reapproximated to pierce the tissue in another location, typically about 5 mm to about 20 mm away. Then the next fixation device in line will be pushed out of the delivery needle. The needle tip is removed and the process will repeat for as many fixation devices as are loaded into the fixed tube.

When all the fixation devices have been placed in the tissue, the suture outside of the of delivery handle is pulled taut which creates a purse string effect. Now the delivery device can be removed and a locking device (e.g., locking mechanism) such as a cinch or special knot can be pushed down to complete and lock the purse string effect. Additional locking mechanisms that may be used include a tag, a barb, a cinch, a toggled needle, or distal knot. The remaining suture is cut.

Alternately an additional fixation device, as described above can be added to the delivery instrument such as to act as a locking device.

The fixation devices are advanced or driven by a handle assembly that employs an internal metering function of the devices for the predetermined length of each fixation device. The handle assembly controls the delivery tubes and locks when required.

In some embodiments, the fixation devices are a string of several hollow braided suture segments placed end to end over a flexible strand (e.g., monofilament, or a braided suture). The string of braided suture segments are stored in a tube and extruded out of the needle for delivery. The string of braided suture segments on the flexible strand (e.g., suture) has a certain column strength that is determined by a given composition and characteristics of the braided suture segments and the flexible strand. The column strength of a given string of braided suture segments may be strengthened (e.g., stiffened) by treating the braided suture segments. Given braided suture segments may be strengthened by heating the braided suture segments. Given braided suture segments may also be strengthened by coating them with a cyanoacrylate coating.

The braided suture segments may be formed of soft materials such as yarns, fibers, filaments, strings, fibrils, strands, sutures, etc., or any combination of such materials. The soft materials may be synthetic or natural materials, or combinations of synthetic and natural materials, and may be bio-degradable or non-degradable within the scope of this disclosure. In one non-limiting embodiment, the soft anchor assembly 10 is made exclusively of soft, suture-based materials.

Figure 1B:
FIG. 1B shows a schematic plan view of a flexible braided anchor assembly for tissue fixation according to one embodiment of the present disclosure after cinching the suture tight.
Figure 1B:
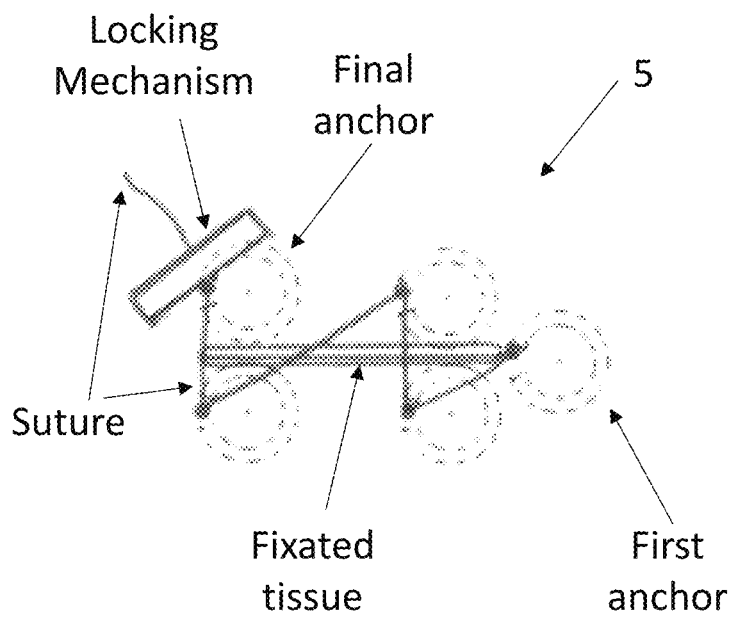

FIG. 1A and FIG. 1B show schematic plan views of a flexible braided anchor assembly 5 for tissue fixation according to one embodiment of the present disclosure before and after cinching the suture tight. A suture (e.g., flexible strand) connecting the five anchor segments is shown on the proximal side (above the plane of the page) of the tissue. The five braided anchor segments are positioned on the distal side (below the plane of the page) of a tissue. The anchors are shown in dashed lines since the drawings are intended to show the anchors below the tissue surface.

In FIG. 1A, the flexible braided anchor assembly 5 includes anchors on one side (distal side) of a tissue that is to be repaired, and they are strung together on a suture that is displayed on the opposite side (proximal side) of the tissue. As shown in this embodiment, the five anchors are situated around an opening in the tissue that is to be repaired. The suture is anchored at the first braided anchor segment and connects anchor segments 2-5 with a single suture. The suture is free to extend beyond a final anchor.

In FIG. 1B, the flexible braided anchor assembly 5 has been drawn together to close and fixate the opening by pulling the suture taut. By pulling the suture taut, the exposed edges of the opening in the tissue are drawn together and the opening is fixated (e.g., joined). The opening has been closed by pulling the suture tight. A locking mechanism is engaged with the suture to lock the suture and prevent the fixated tissue from pulling apart. By tightening the suture to draw in the anchors and close the opening in the tissue, the flexible assembly of five braided anchor segments 5 has closed the opening like pulling purse strings to close a purse.

FIGS. 2A-2H show schematic cross section illustrations of some embodiments of delivery devices deploying an assembly of braided anchor segments.

Figure 2A:
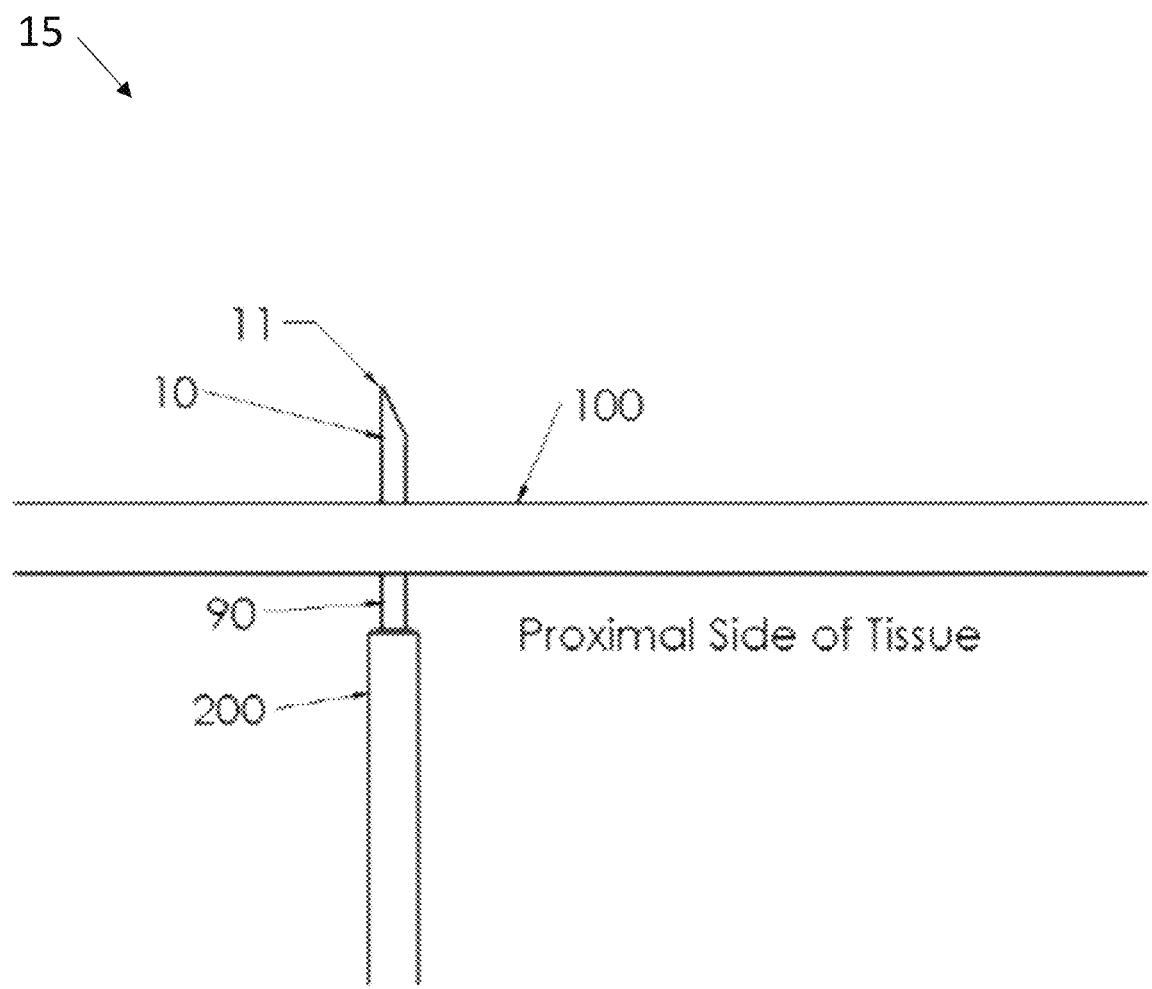
FIG. 2A shows a schematic cross section illustration of a delivery device with a needle after puncturing tissue according to an embodiment of the present disclosure.

FIG. 2A shows a schematic cross section illustration of a delivery device 15 with a needle 10 having a needle tip 11 after puncturing tissue 100 according to an embodiment of the present disclosure. The needle 10 punctures a first hole (not shown) in the tissue 100. The needle 10 punctures the tissue from a proximal side of the tissue 100 to a distal side of the tissue 100. The needle 10 is at a distal end of an outer tube 90, and the outer tube 90 is coupled to a handle assembly 200.

In some embodiments, the needle 10 and the outer tube 90 may be fabricated as a single piece, whereas in other embodiments, the needle 10 and the outer tube 90 may be assembled from separate pieces. The needle 10 and the outer tube 90 may be fabricated from one or more rigid materials, such as a steel, aluminum, titanium, and so on. The rigid material may also include metallic alloys such as nitinol. In embodiments, when the needle 10 and the outer tube 90 are assembled from separate pieces, the needle 10 and the outer tube 90 may be fabricated from different rigid materials.

Figure 2B:
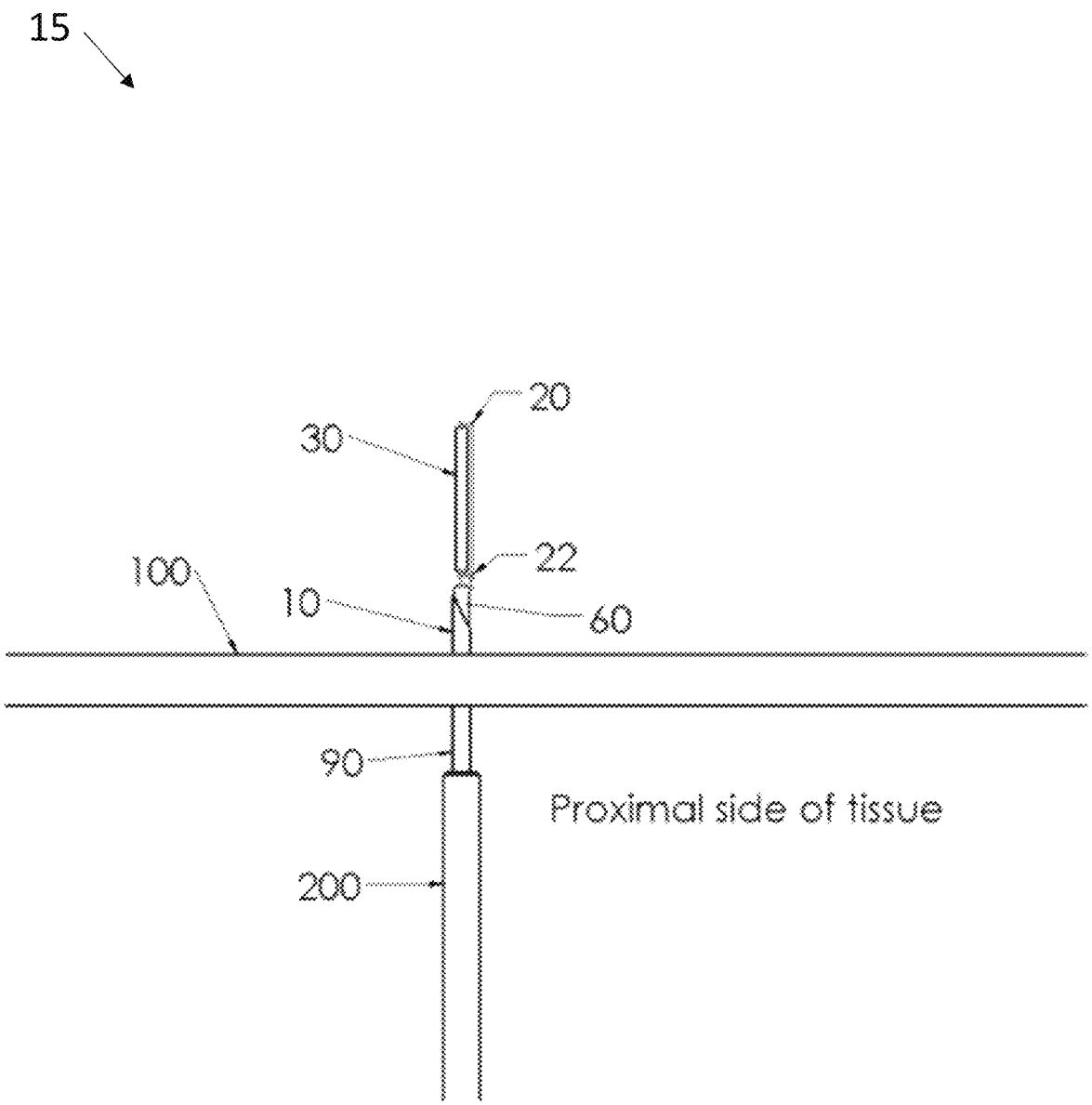
FIG. 2B shows a schematic cross section illustration of a delivery device with a first braided suture segment after being extruded from the needle on the distal side of the tissue.

FIG. 2B shows a schematic cross section illustration of a first braided suture segment 30 after being extruded from the needle 10 on the distal side of the tissue 100. The first braided suture segment 30 is pushout distally out of the needle by a first drive tube 60. A flexible strand (e.g., suture) 20 is shown threaded thru the first braided suture segment 30, looped around, and knotted with a slidable slip knot 22 around the suture 20 between first braided suture segment 30 and the first drive tube 60.

In embodiments, the flexible strand (e.g., suture) 20 may be a monofilament. In other embodiments, the flexible strand 20 may be a suture. The suture 20 may be a braided polyester suture. In embodiments, the suture 20 may be a FiberWire®, TigerWire®, or FiberChain® suture, although any type of suture 20 may be utilized, including cored or coreless sutures. In another embodiment, the flexible strand 20 may be suture tape, such as FiberTape®. The flexible strand 20 may include any soft, flexible strand of material.

In some embodiments, the braided suture segments 30 may be strengthened by heating the braided suture segments 30. The braided suture segments may also be strengthened by coating them with a cyanoacrylate coating.

Figure 2C:
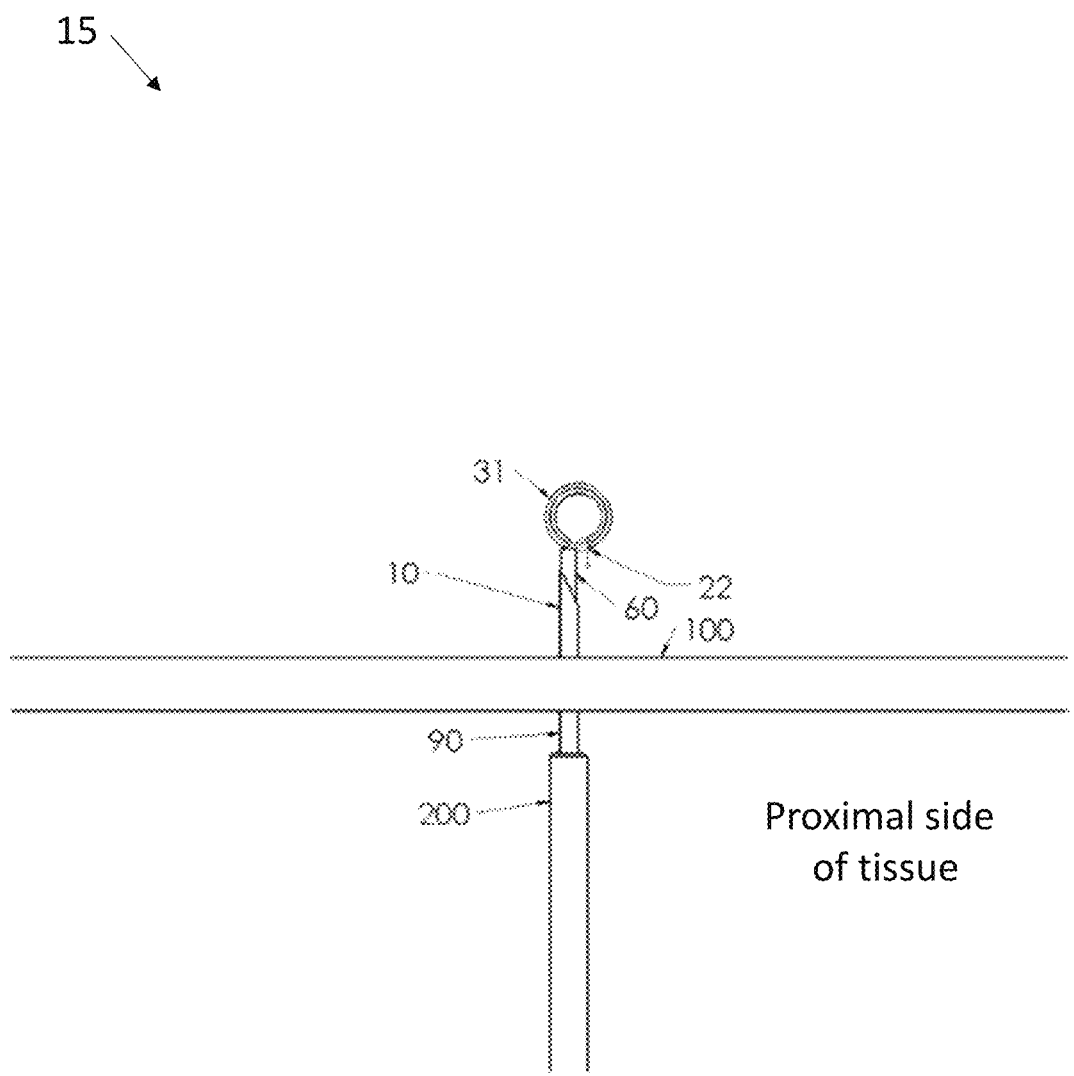
FIG. 2C shows a schematic cross section illustration of a delivery device with a first braided anchor segment after the suture has been pulled taut a first time.

FIG. 2C shows a schematic cross section illustration of a first braided anchor segment 31 after the suture 20 has been pulled taut a first time. As a result of the suture 20 being pulled tight, the first braided suture segment 30 has been deformed into a first braided anchor segment 31. The first braided suture segment 30 serves as an anchor to the flexible braided anchor assembly 5. By pulling the suture 20, the slip knot 22 is tightened to secure the first braided anchor segment on the distal surface of the tissue. The first braided anchor 31 may also be secured by locking the suture in place with any one of locking mechanisms including a tag, a barb, a cinch, a toggled needle, or a distel knot.

In embodiments where the braided suture segments have been strengthen by heating, or by coating them with a cyanoacrylate coating, deforming the braided suture segment by pulling suture 20 cracks or breaks up the coating on the braided suture segment 30.

Figure 2D:
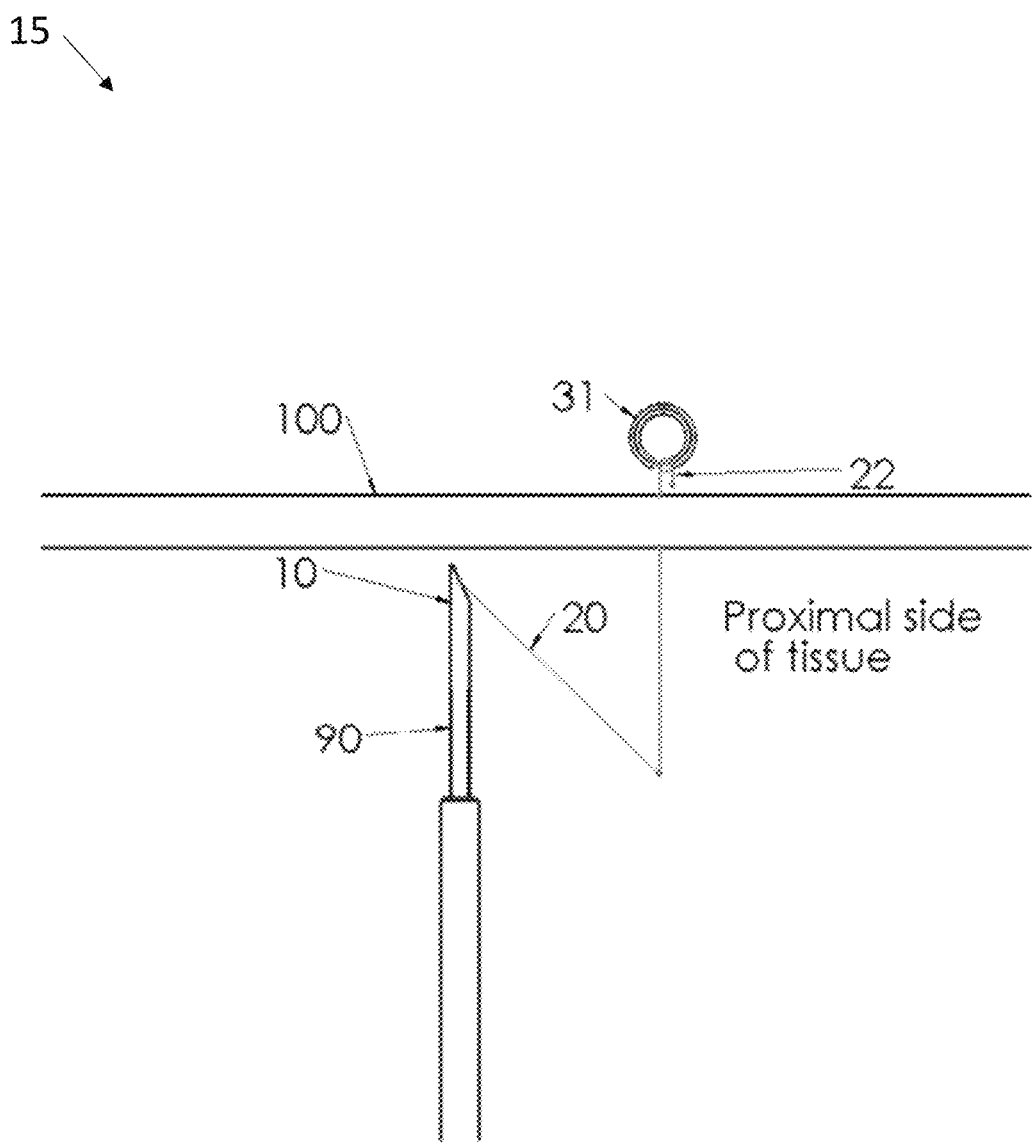
FIG. 2D shows a schematic cross section illustration of a delivery device with the needle being repositioned above the tissue prior to puncturing the tissue in a second location.

FIG. 2D shows a schematic cross section illustration of the needle 10 being repositioned above the tissue 100 prior to puncturing the tissue in a second location. In embodiments, the second location may be between about 3 mm and about 20 mm from the first location, whereas in other embodiments the second location may be between about 5 mm and about 15 mm from the second location, whereas in other embodiments the second location may be between about 8 mm and about 12 mm from the first location. After withdrawing the needle 10 from the tissue 100, there is approximately 4 cm of suture slack present prior to puncturing the tissue at the second location.

Figure 2E:
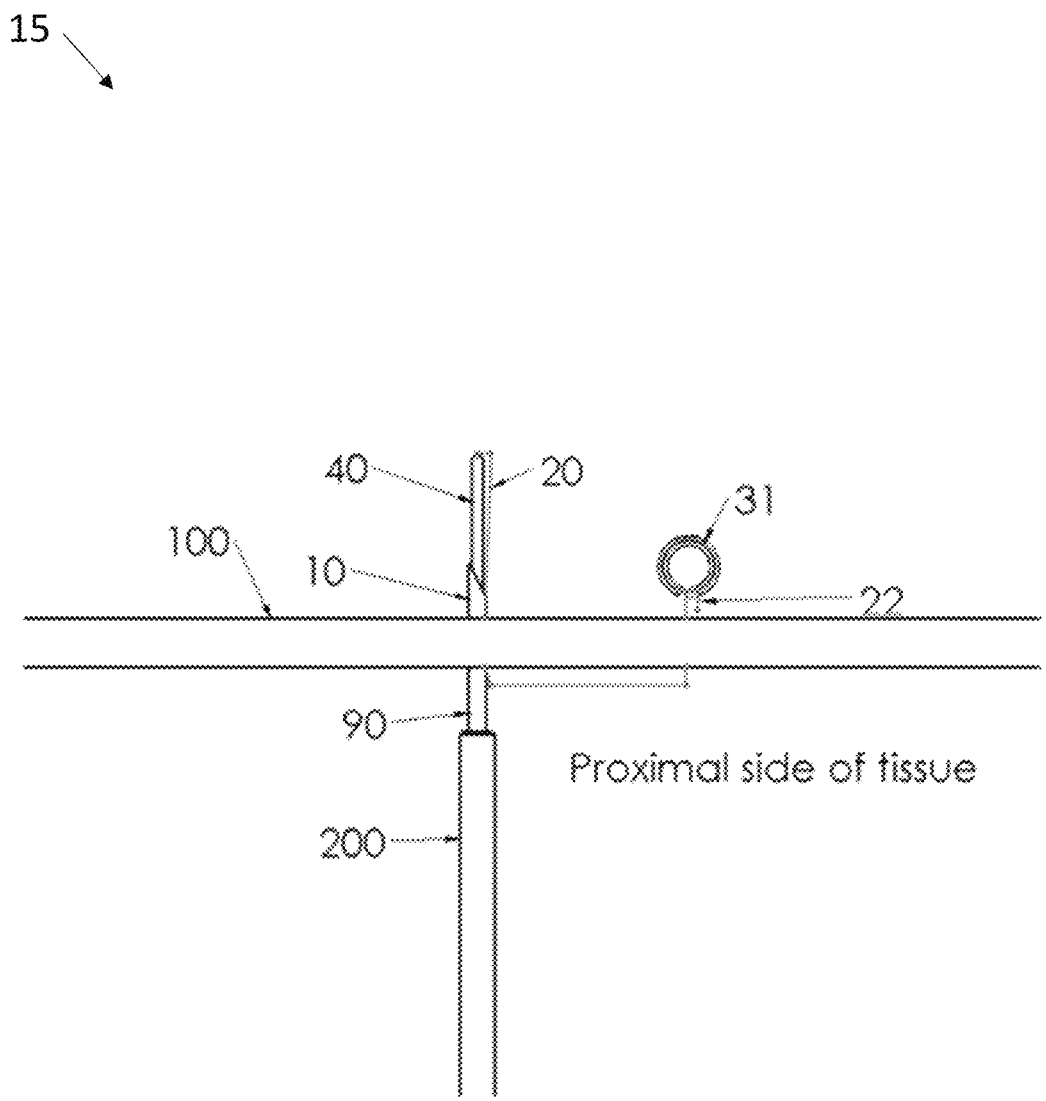
FIG. 2E shows a schematic cross section illustration of a delivery device with a second braided suture segment partially extruded from the needle.

FIG. 2E shows a schematic cross section illustration of a second braided suture segment 40 partially extruded from the needle 10. The second braided suture segment 40 is pushed from the needle by a second drive tube 70. The suture 20 passes from the first anchor segment 31 through the first hole (not shown), is strung along the proximal side of the tissue and is fed up through a second hole (not shown) made from puncturing the tissue a second time with the needle 10. The suture 20 loops around the second braided suture segment 40 and passes through a bore hole (not shown) in the second braided suture segment. The suture is threaded through the braided suture segments remaining in the outer tube 90.

Figure 2F:
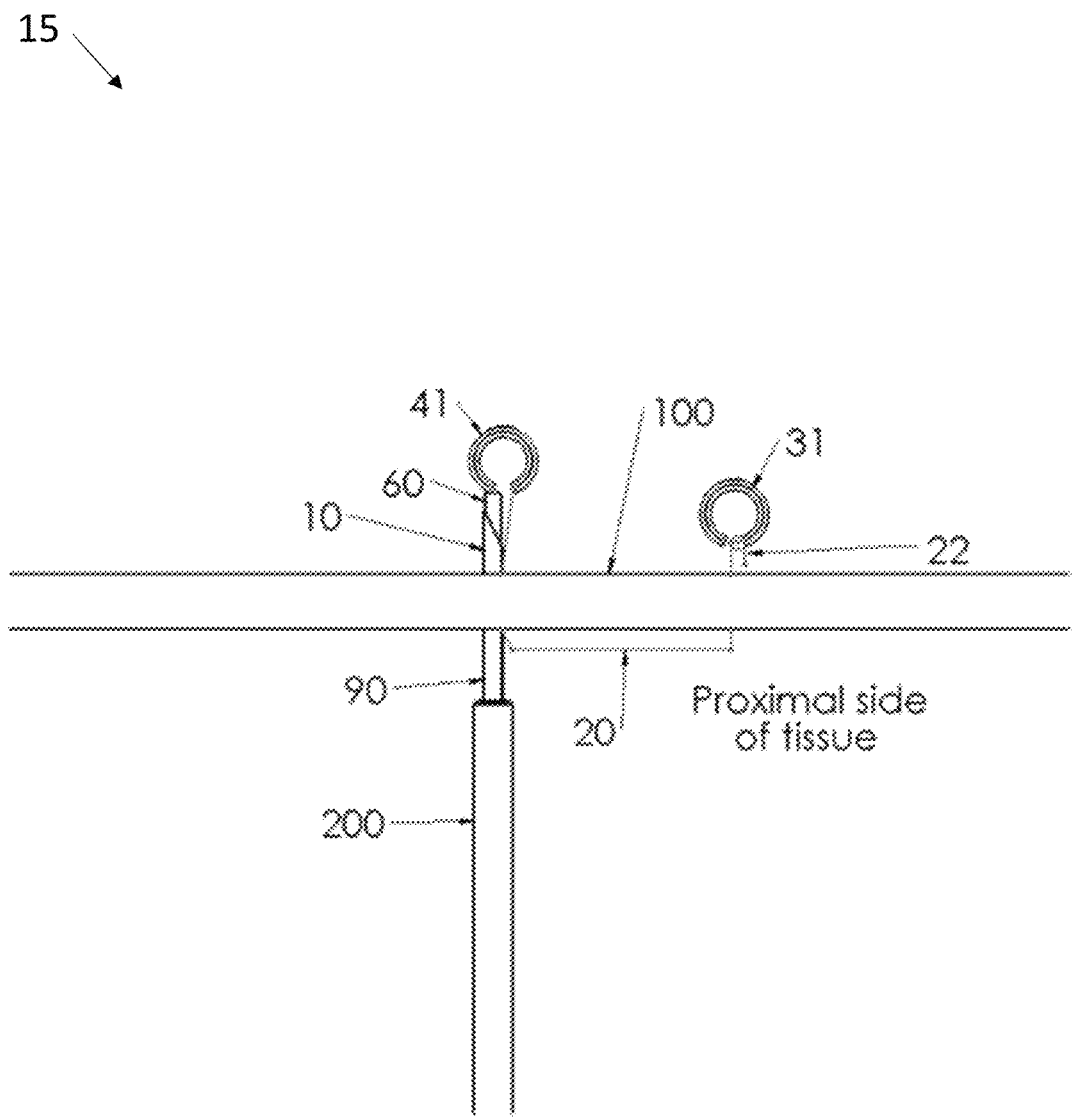
FIG. 2F shows a schematic cross section illustration of a delivery device with a second braided anchor segment after the suture has been pulled taut a second time.

FIG. 2F shows a schematic cross section illustration of a second braided anchor segment 41 after the suture 20 has been pulled taut a second time. As a result of the suture 20 being pulled taut, the second braided suture segment 40 has been deformed into a second braided anchor segment 41. The second braided anchor segment 41 is still adjacent to the first drive tube 60 after the suture 20 has been pulled taut a first time.

At this point in the deployment of the flexible braided anchor segment assembly 5, the suture 20 has been pulled taut twice. First, it was pulled taut to deform the first braided suture segment 30. Then, the suture was pulled taut a second time to deform the second braided suture segment 40.

Figure 2G:
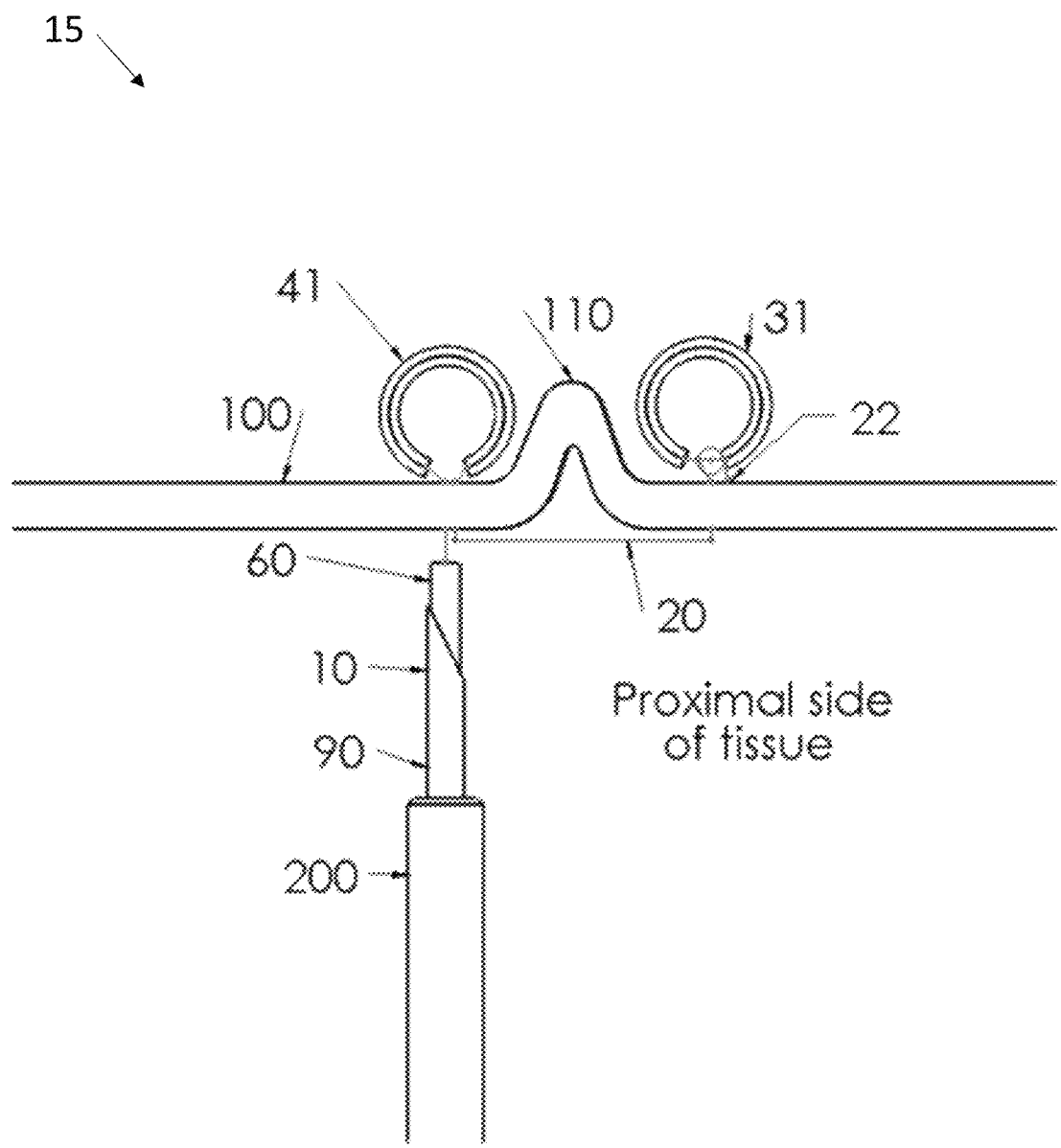
FIG. 2G shows a schematic cross section illustration of a delivery device with the first braided anchor segment and second braided anchor segment after the needle has been withdrawn from the tissue and suture has been pulled taut a third time.

FIG. 2G shows a schematic cross section illustration of the first braided anchor segment 31 and second braided anchor segment 41 after the needle 10 has been withdrawn from the tissue 100 and suture 20 has been pulled taut a third time. Braided anchor segments 31, 41 are positioned on a distal surface of a tissue 100. By pulling the suture 20 taut a third time after the needle has been removed, the third pulling of the suture 20 moves the first anchor segment 31 and the second braided anchor segment 41 together. By pulling the first two anchor segments 31,41 together, a fold 110 is formed in the tissue 100 between the first two anchor segments 31,41.

The portion of the flexible strand 20 that connects braided anchor segments 31 and 41 on the proximal surface of the tissue 100 has been pulled taut thereby causing the tissue 100 between the braided anchor segments 31 and 41 to be pulled together and to form a fold 110. The first braided anchor segment has a sliding slipknot 22 that anchors the anchor in the tissue 100. This figure illustrates braided anchor segments 31, 41 are positioned on a distal surface of a tissue 100. The braided anchor segments are interconnected via a flexible strand (e.g., a suture) 20.

Figure 2H:
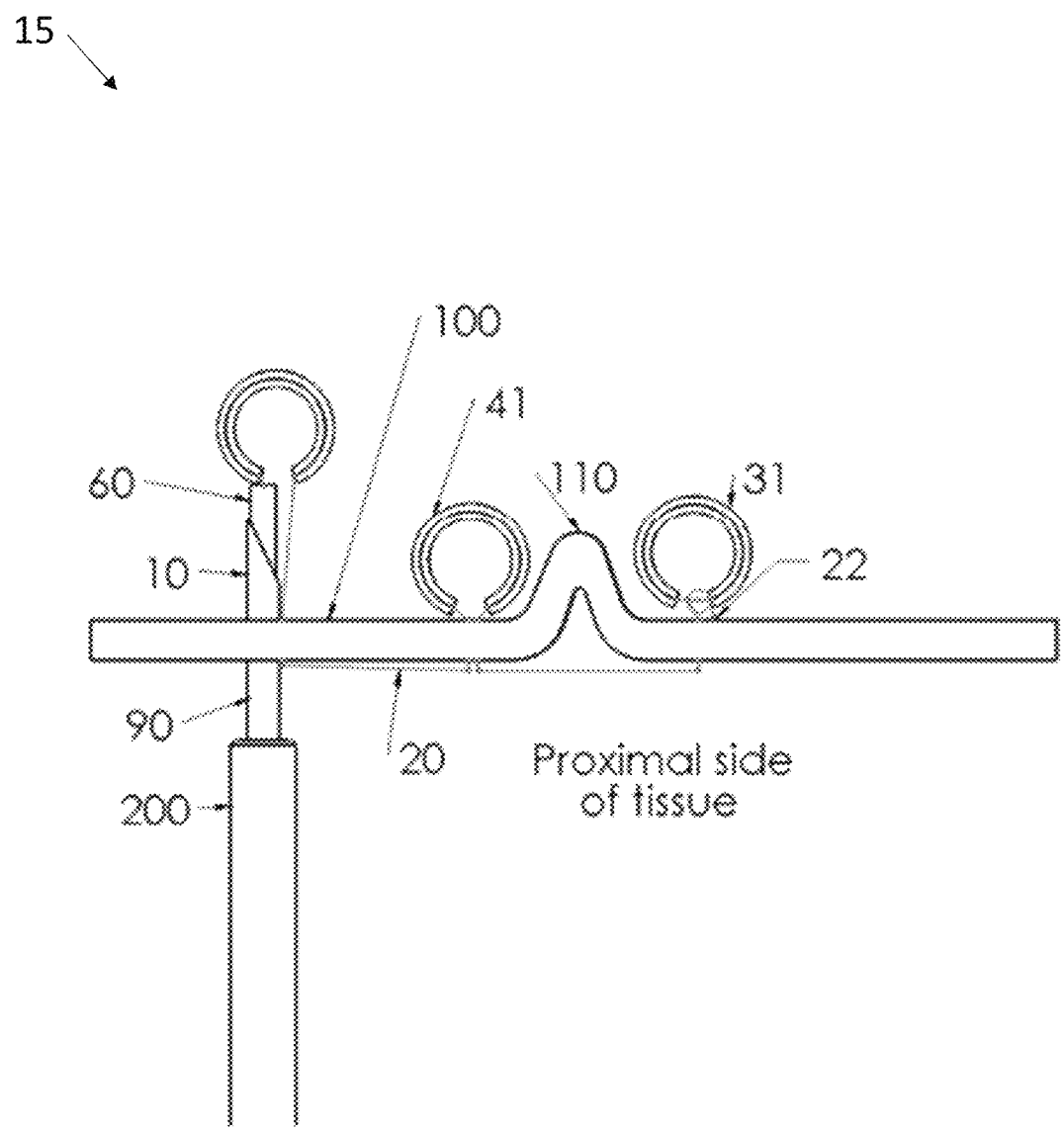
FIG. 2H shows a schematic cross section illustration of a delivery device with the first braided anchor segment, second braided anchor segment, and a third braided anchor segment.

FIG. 2H shows a schematic cross section illustration of the first braided anchor segment 31, second braided anchor segment 41, and a third braided anchor segment 51. The third braided anchor segment 51 is in a stage of being implanted in the tissue 100. The third braided anchor segment 51 is at the distal end of the delivery needle 10 and is adjacent the second drive tube 60. In FIG. 2H, the suture has been pulled taut a fourth time deforming the third braided suture segment into the third braided anchor segment 51.

Figure 3:
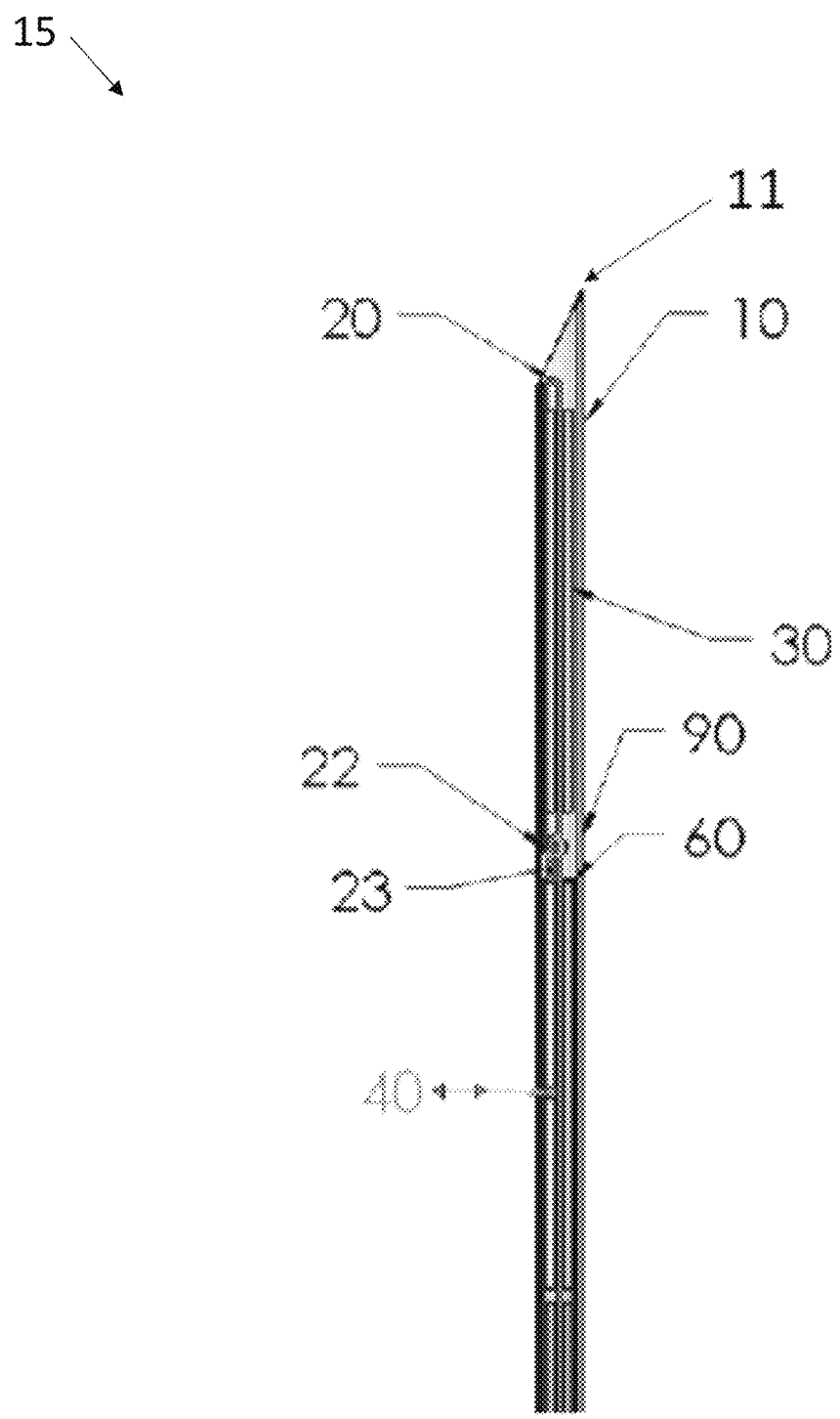
FIG. 3 is a cross section of an embodiment of a delivery device with portion of a delivery device including an outer tube having a delivery needle with a needle tip.

FIG. 3 is a cross section of an embodiment of a portion of a delivery device including an outer tube 90 having a delivery needle 10 with a needle tip 11. The outer tube 90 is preloaded with three braided suture segments 30,40,50 that are interconnected via a suture 20. The braided suture segments (e.g., segments, or suture segments) are a hollow material which enables suture 20 to pass and slide through each of the braided suture segments. The suture 20 incorporates a sliding slip knot 22 that is placed proximally to segment 30. Segment 30 is positioned to be the first suture segment to be delivered. As such, it is a primary braided suture segment, because the sliding slip knot is placed proximally to the braided suture segment 30 to allow it to participate in anchoring the primary suture segment 30 on the distal side of the tissue.

A needle tip 11 on a delivery needle 10 is used to pierce (e.g., puncture) the tissue 100 for placement of each segment. The needle tip 11 is a sharp point on the delivery needle 10. First drive tube 60 is advanced to push primary suture segment 30 out of the needle 10, and then remains in the advanced position. Suture end (e.g., suture tail) 23 is the cut end of the suture 20 after the formation of the sliding knot 22. Suture tail 23 may be used as a barb to increase holding strength or aid in preventing pullout of slip knot 22 or first braided anchor segment 31. Braided suture segment 40 is positioned in first drive tube 60.

Figure 4:
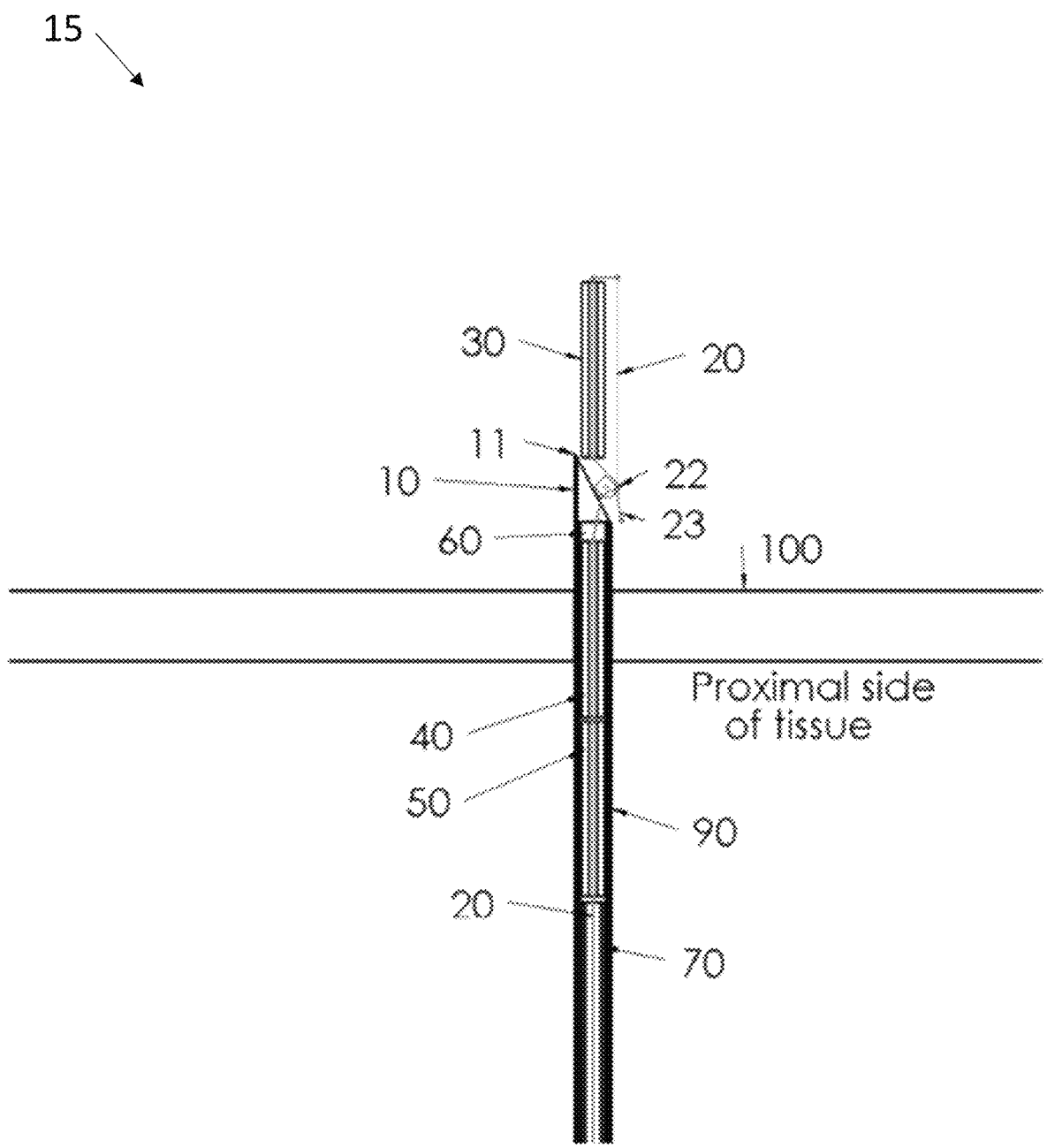
FIG. 4 is a cross section of an embodiment of a delivery device with a portion of a delivery device that has punctured the tissue and has delivered the first braided suture segment to a distal side of tissue

FIG. 4 is a cross section of an embodiment of a portion of a delivery device that has punctured the tissue 100 and has delivered the first braided suture segment 30 to a distal side of tissue 100. FIG. 4 shows needle 10 and needle tip 11 punctured thru tissue 100 with segment 30 pushed out of needle 10 by first drive tube 60. After extruding segment 30 from the delivery needle 10, first drive tube 60 remains locked in the position with respect to needle tip 11. Suture segments 40 and 50 are positioned in first drive tube 60. In some embodiments, suture segments are pressure fit in first drive tube 60 at a detent in the first drive tube.

Second drive tube 70 is located in first drive tube 60 with the distal end of second drive tube 70 adjacent the proximal end to braided suture segment 50. Second drive tube 70 has an outer diameter that is smaller than the inner diameter of first drive tube 60, and second drive tube 70 is used to push the second through final suture segments out of the distal end first drive tube 60. Each braided suture segment, beginning with the second braided suture segment is extruded in order from the first drive tube 60 as the column of suture segments is pushed by second drive tube 70. The suture 20 is threaded through each suture segment. Once the distal end of each successive suture segment is extruded out of first drive tube 60, the segments exit delivery needle 10 to the distal side of tissue 100. The second and follow on segments that are extruded from the distal end of first drive tube 60 move through first drive tube 60 and outer tube 90 only in the distal direction. It is surprising that the disclosed delivery process moves in a distal direction only and does not have to retract to load subsequent anchors, nor are the braided suture segments carried on an external slider device. Furthermore, the flexible strand (e.g., suture) traverse the entire length of the bore of the delivery handle and exits the delivery handle. Additional surprising features include that the braided suture segments slide along the first drive tube 60 and are not on or related to being delivered over a rod, and that the delivery device can deploy many devices, from 1 braided suture segment up to and including 25 braided suture segments.

Figures 5A, 5B, 5C:
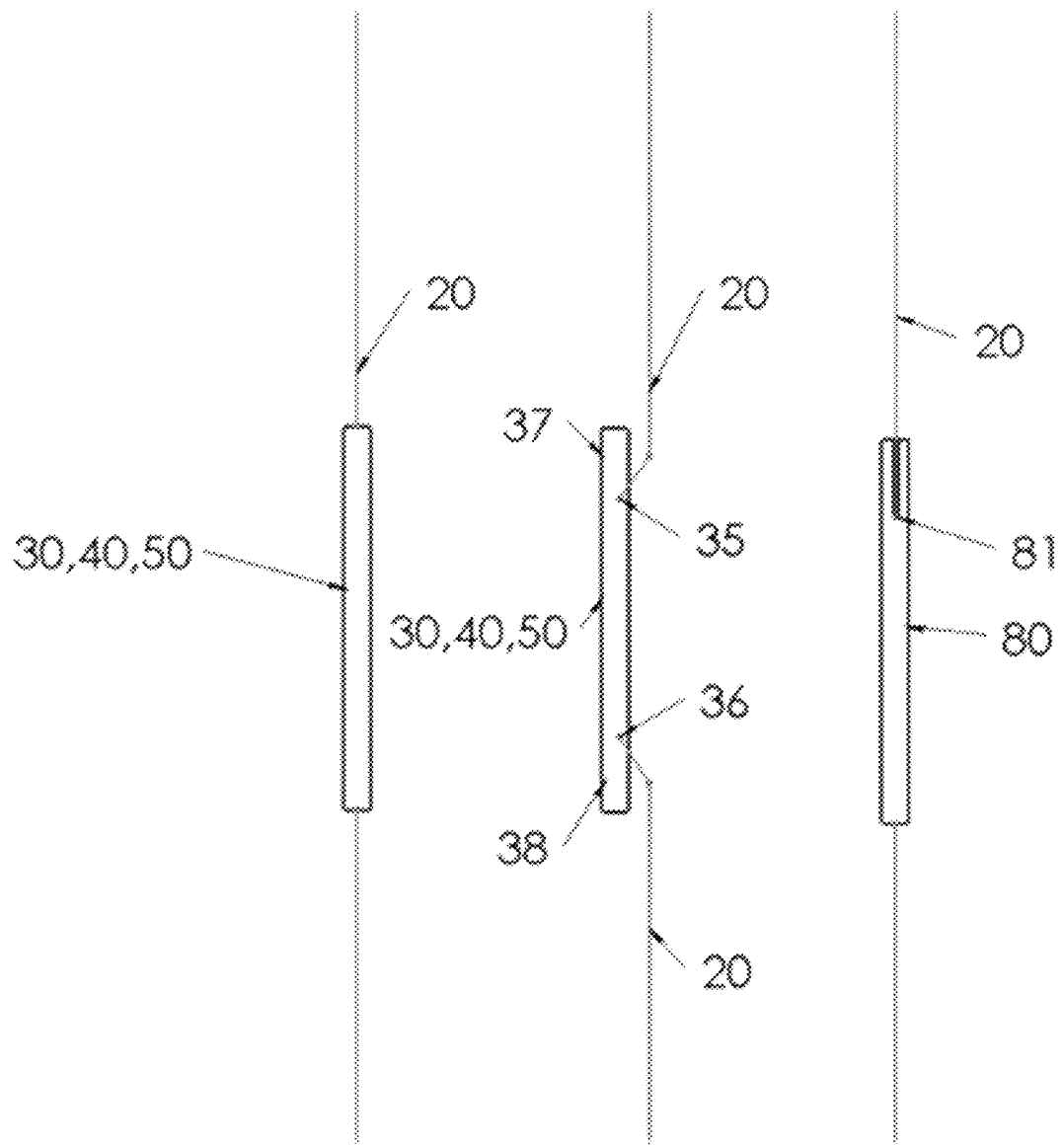
FIG. 5A shows an embodiment of a braided suture segment.
FIG. 5B shows another embodiment of a braided suture segment.
FIG. 5C shows another embodiment of a braided suture segment.

FIG. 5A shows an embodiment of a braided suture segment 30, 40, or 50 and is hollow allowing for suture 20 to pass and slide through it. In embodiments, there may be from 1 to 25 braided suture segments on a suture 20, while in some embodiments there may be 1 to 10 braided suture segments on a suture 20, while in still other embodiments there may be 1 to 5 braided suture segments on a suture 20, while in still other embodiments there may be 1 to 3 braided suture segments on a suture 20, while in still other embodiments there may be only 1 braided suture segment on a suture 20.

FIG. 5B shows an embodiment of a braided suture segment 30, 40, or 50 that has been modified such that the suture 20 is passed through the braided fibers of the side wall of the segments 30, 40, 50, into the cannulation and back out through the braided fiber side wall again. A feature of this version is that when the segment is placed distally past the tissue and pulled taut, the free ends 37 and 38 would aid in preventing any pullout back through the hole created by the needle 10.

FIG. 5C shows an embodiment of a braided suture segment 80 having a slit or cut 81. The slit or cut 81 can be formed by a razor blade or any suitable cutting device and its function is to spread the cylindrical device yet further when the suture 20 is pulled taut. The suture 200 would enter the slit 81 causing the slit 81 to split apart or widen. Slits 81 can be on one or both ends of the braided suture segment.

FIG. 6A shows a schematic illustration of an embodiment of braided suture segments on a suture 20. In this embodiment, a series of suture segments are strung on a suture with a slip knot 22 being positioned after the final braided suture segment on the suture 20. FIG. 6A shows a first braided suture segment 130, a second braided suture segment 140, a third braided suture segment 150, and a fourth braided suture segment 160 on a suture 20. In this embodiment, a slip knot 22 is positioned proximal to the fourth braided suture segment 160. That is, in this embodiment, there is no slip knot present at the proximal end of the first braided anchor segment 31, but the slip knot is positioned following the final braided suture segment threaded onto the suture.

In other embodiments, a slip knot or other locking mechanism may be positioned proximally to any segments of an assembly of braided suture segments. That is, a slip knot 22 or other locking mechanism may be positioned proximal to any of suture segments 130, 140, 150, or 160, for example.

FIG. 6B shows a schematic illustration of an assembly of braided anchor segments as they are deployed on the distal side of a tissue. In this embodiment, the assembly of braided suture segments is only anchored to the tissue at where the slip knot is pulled taut. In this embodiment, the assembly of braided anchor segments has a large surface area that enables a large securing surface with only one hole formed in the tissue. This may be useful in retracting tissue from other tissue and holding it in place while other procedures are being undertaken.

Figure 7A:
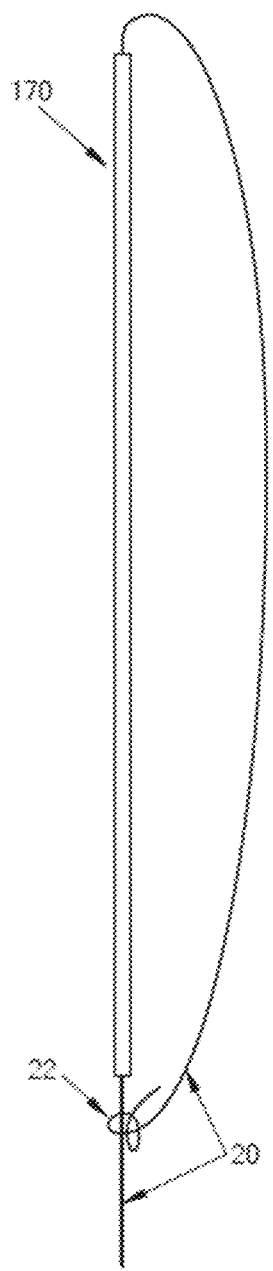
FIG. 7A shows yet another embodiment of a braided suture segment.

FIG. 7A shows a schematic illustration of an embodiment of a long braided suture segment 170 on a suture 20. In this embodiment the long braided suture segment 170 may be between 40 mm and 70 mm. In this embodiment, a slip knot 22 is positioned proximal to the long braided suture segment 170. In this embodiment, the long braided anchor 170 segment has a large surface area that enables a large securing surface with only one hole formed in the tissue. This may be useful in retracting tissue from other tissue and holding it in place while other procedures are being undertaken.

Figure 7B:
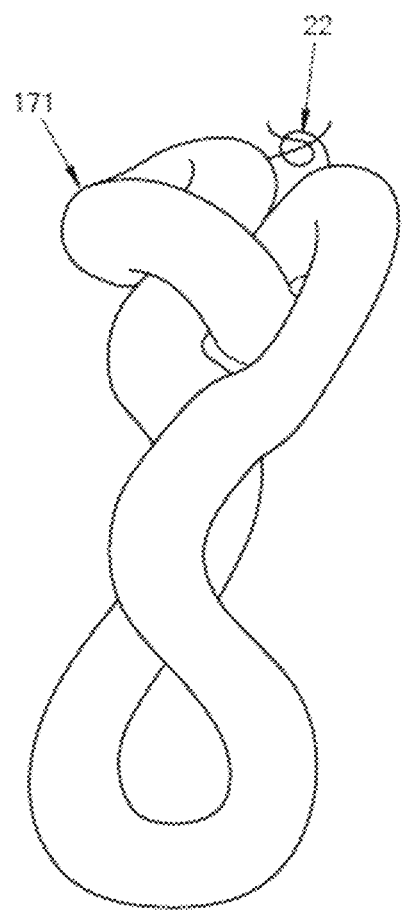
FIG. 7B shows yet another embodiment of a braided suture segment.

FIG. 7B shows a schematic illustration of a long braided anchor segment 171 as it is deployed on the distal side of a tissue. In this embodiment, the long braided anchor segment 171 is only anchored to the tissue at where the slip knot is pulled taut. In this embodiment, the long braided anchor segment 171 has a large surface area that enables a large securing surface with only one hole formed in the tissue. This may be useful in retracting tissue from other tissue and holding it in place while other procedures are being undertaken.

Figure 8:
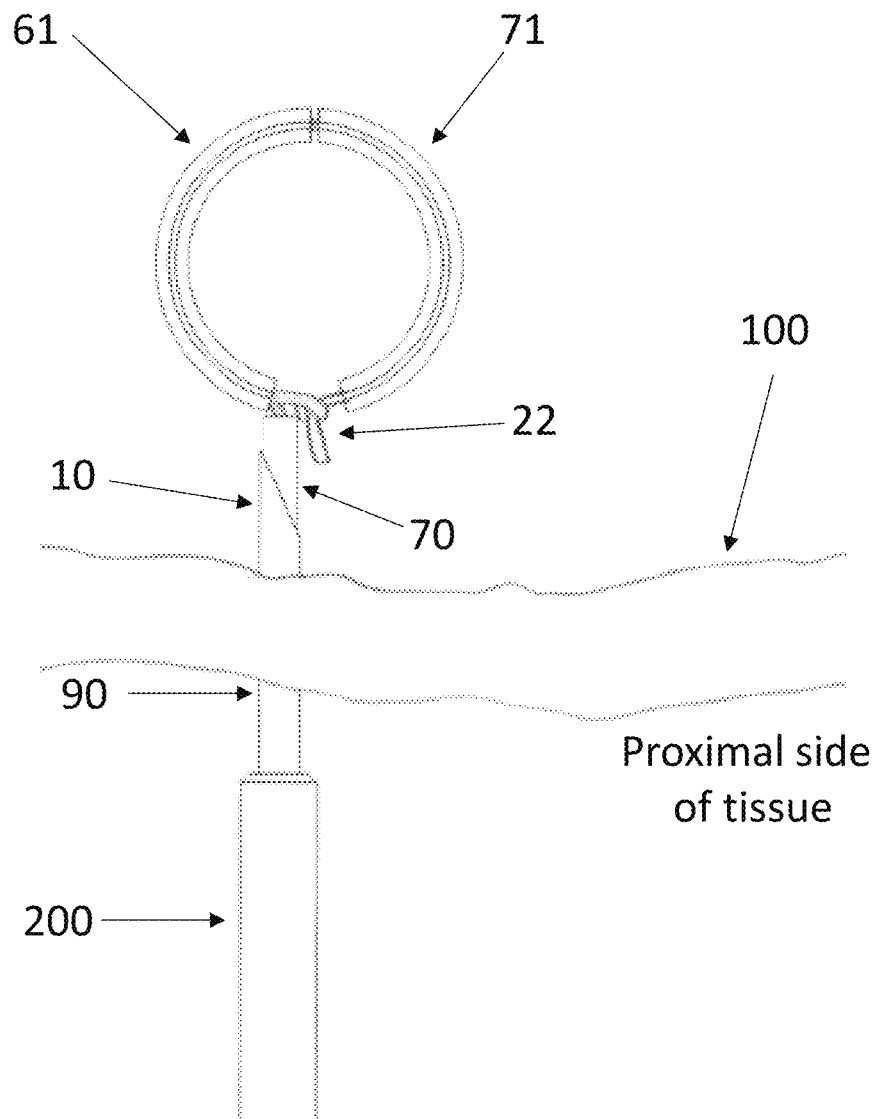
FIG. 8 shows still another embodiment of a braided suture segment.

FIG. 8 shows a schematic cross section illustration of a delivery device with two braided anchor segments 61,71 after the suture 20 has been pulled taut a first time. As a result of the suture 20 being pulled tight, the first braided anchor segment 61 and the second braided anchor segment 71 have been deformed into a dual braided anchor segment 61,71. In this embodiment, the dual braided anchor segment 61,71 has a large surface area that enables a large securing surface with only one hole formed in the tissue. This may be useful in retracting tissue from other tissue and holding it in place while other procedures are being undertaken.

Note that in this embodiment, there is no slip knot present at the proximal end of the first braided anchor segment 61. Here, the slip knot 22 is tied off proximal to braided suture segment 71.

Figure 9A:
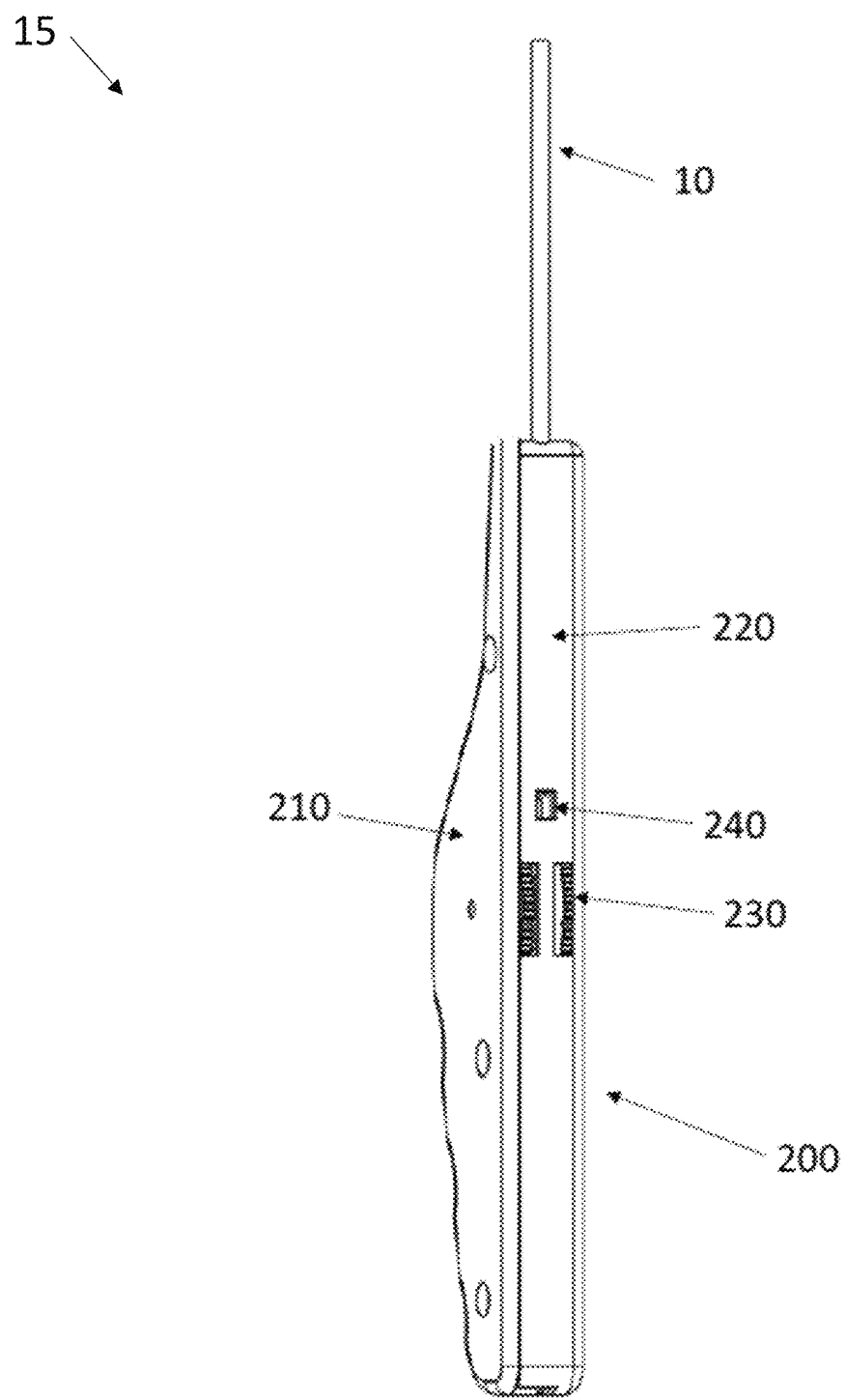
FIG. 9A shows an embodiment of a delivery device with a handle assembly with handle cover screwed to handle base.

FIG. 9A shows an embodiment of a delivery device with a handle assembly 200 with handle cover 210 screwed to handle base 220. Outer tube 90 is attached to handle base 220 with wheel 230 inside of the handle assembly 200. Rack 240 includes a visual numerical character to show the position of each braided suture segment as each braided suture segment is deployed. A needle is not shown on the outer tube 90.

Figure 9B:
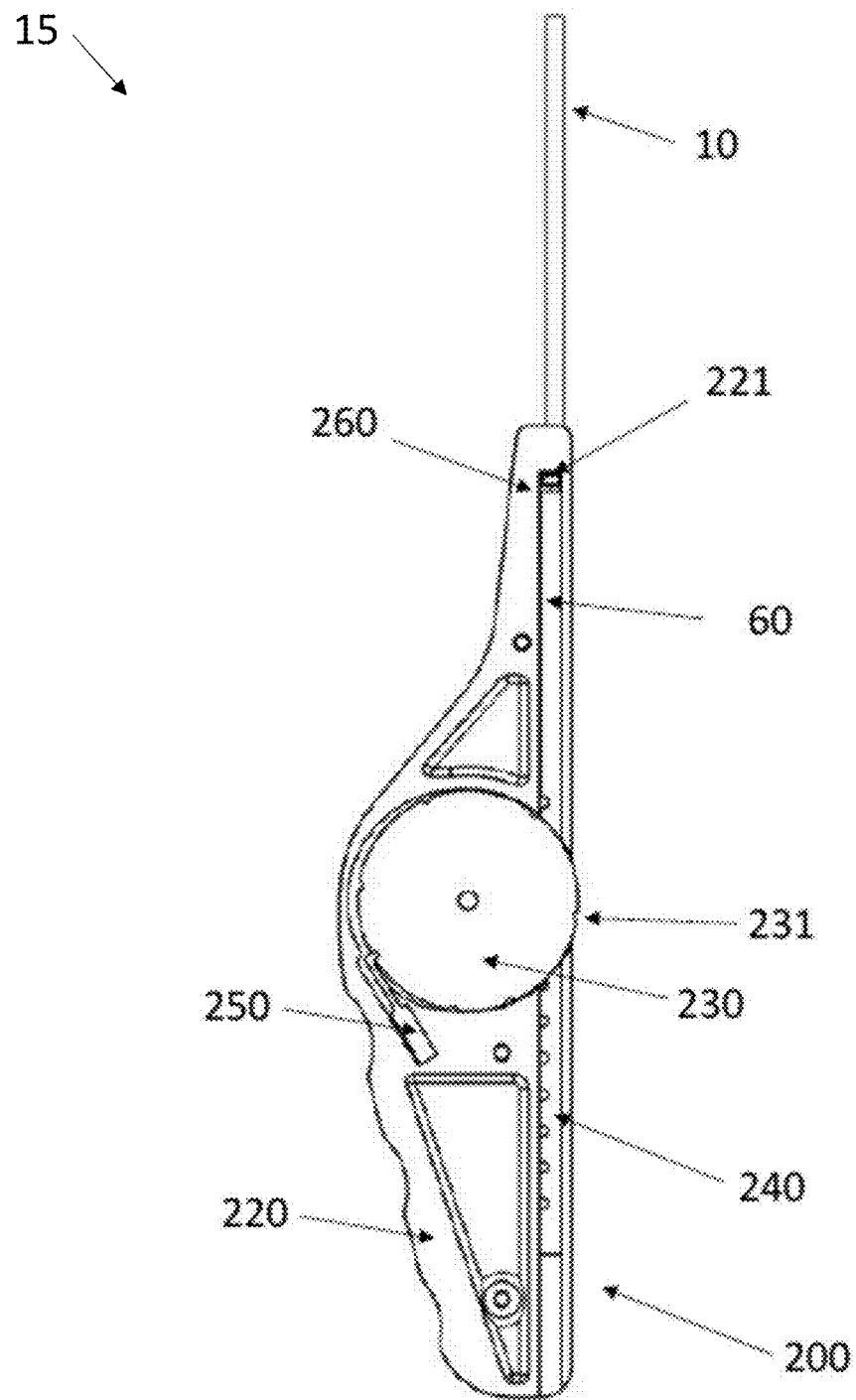
FIG. 9B shows an embodiment of a delivery device with a handle assembly with the handle cover removed for visualization.

FIG. 9B shows an embodiment of a delivery device with a handle assembly 200 with the handle cover 210 removed for visualization. Wheel 230 has an internal drive gear, not shown, that meshes with rack 240. As wheel 230 is rotated counterclockwise pawl 250 engages in the wheel cogs 231 to stop at predetermined locations. As rack 240 advances, the first drive tube 60 is advanced to extrude a first braided suture segment (e.g., segment) out of the needle (not shown). A spring (not shown) may be included in the handle assembly to drive first drive tube 60. Once the first braided suture segment is out of the needle, the first drive tube 60 is temporarily fixed to stop 260 until stop 260 engages with handle edge 221. In embodiments, a spring (not shown) may be positioned between stop 260 and handle edge 221. This will be the first position for the handle assembly. The first segment is also known as the primary segment, since once the primary segment is deployed, the primary segment 30, and first drive tube 60 will disengage from rack 240 via a dimple or breakaway. First drive tube 60 will now stay in this fixed position against handle stop 221.

Subsequent deployment of additional braided suture segments will be accomplished with a second drive tube (not shown). The second drive tube is positioned within first drive tube 60 and attached to rack 240, and will drive thru first drive tube 60 as wheel 230 is rotated to a different positional cog 231 with pawl 250. This can be repeated for additional fixation devices.

Figure 10:
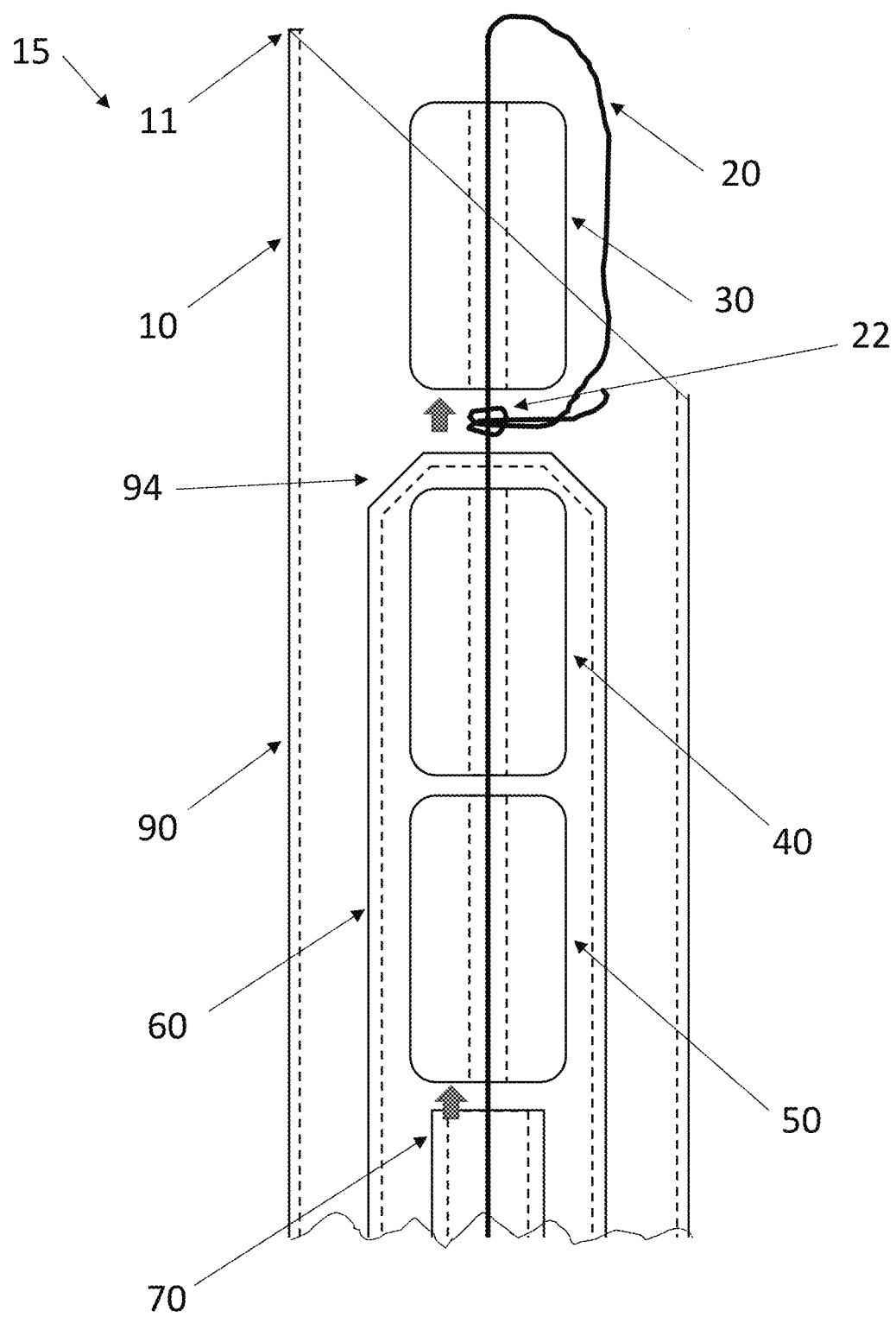
FIG. 10 shows a schematic cross section of an embodiment of a delivery device.

FIG. 10 shows a schematic cross section of an embodiment of a delivery device 15. An outer tube 90 has a delivery needle 10 and a needle tip 11. A first drive tube 60 is positioned concentrically inside of the outer tube 90. First drive tube 60 an outer diameter that is smaller than the inner diameter of outer tube 90, and first drive tube 60 is used to push first braided suture segment 30 out of the distal end outer tube 90 through the delivery needle 10. In embodiments, a distal end of the first drive tube 60 may include a detent 94 that may provide friction so that there is a slight resistive force to the extrusion of braided suture segments. Once the first drive tube 60 has extruded the first suture segment 30, the first drive tube 60 may become temporarily fixed in the outer tube 90.

Each braided suture segment, beginning with the second braided suture segment 40 is extruded in order from the first drive tube 60 as the column of suture segments is pushed by second drive tube 70. A second braided segment 40 and a third braided segment 50 are positioned in the first drive tube 60. In embodiments, the number of braided suture segments positioned in the first drive tube 60 may be between 1 and 10, and in some embodiments, the number of braided suture segments positioned in the first drive tube 60 may be between 2 and 5. A second braided suture segment 40 through a final suture segment may be preloaded in a first drive tube 60 prior to initiation of a tissue anchoring procedure.

A suture (e.g., flexible strand) may be threaded through the braided suture segments and looped around the first suture segment 30 and tied into a slip knot 22 around the suture 20 between the proximal end of the first braided suture segment 30 and the distal end of the first drive tube 60.

A second drive tube 70 is positioned concentrically in the first drive tube 60 with its distal end proximal to the third braided suture segment 50 (e.g., the last braided suture segment that is preloaded into the first drive tube 60). Second drive tube 70 has an outer diameter that is smaller than the inner diameter of first drive tube 60, and second drive tube 70 is used to push the second thru final suture segments out of the distal end first drive tube 60. Each braided suture segment, beginning with the second braided suture segment is extruded in order from the first drive tube 60 as the column of suture segments is pushed distally by second drive tube 70. In general, the second drive tube 70 is positioned proximal to the last braided suture segment in the first drive tube 60 regardless of the number of braided suture segments preloaded into the first drive tube 60.

In some embodiments, a delivery device may not include a first drive tube 60 (not shown). In embodiments, the braided suture segments 30,40,50 may be preloaded into an outer tube 90, and extruded by pushing the braided suture segments 30,40,50 out of outer tube 90 with the second drive tube 70. The braided suture segments 30,40,50 may be press fit into a detent 94 in the first drive tube 60 to provide friction to the sliding of the braided suture segments 30,40,50 against the pressure applied by the second drive tube 70.

Figure 11:
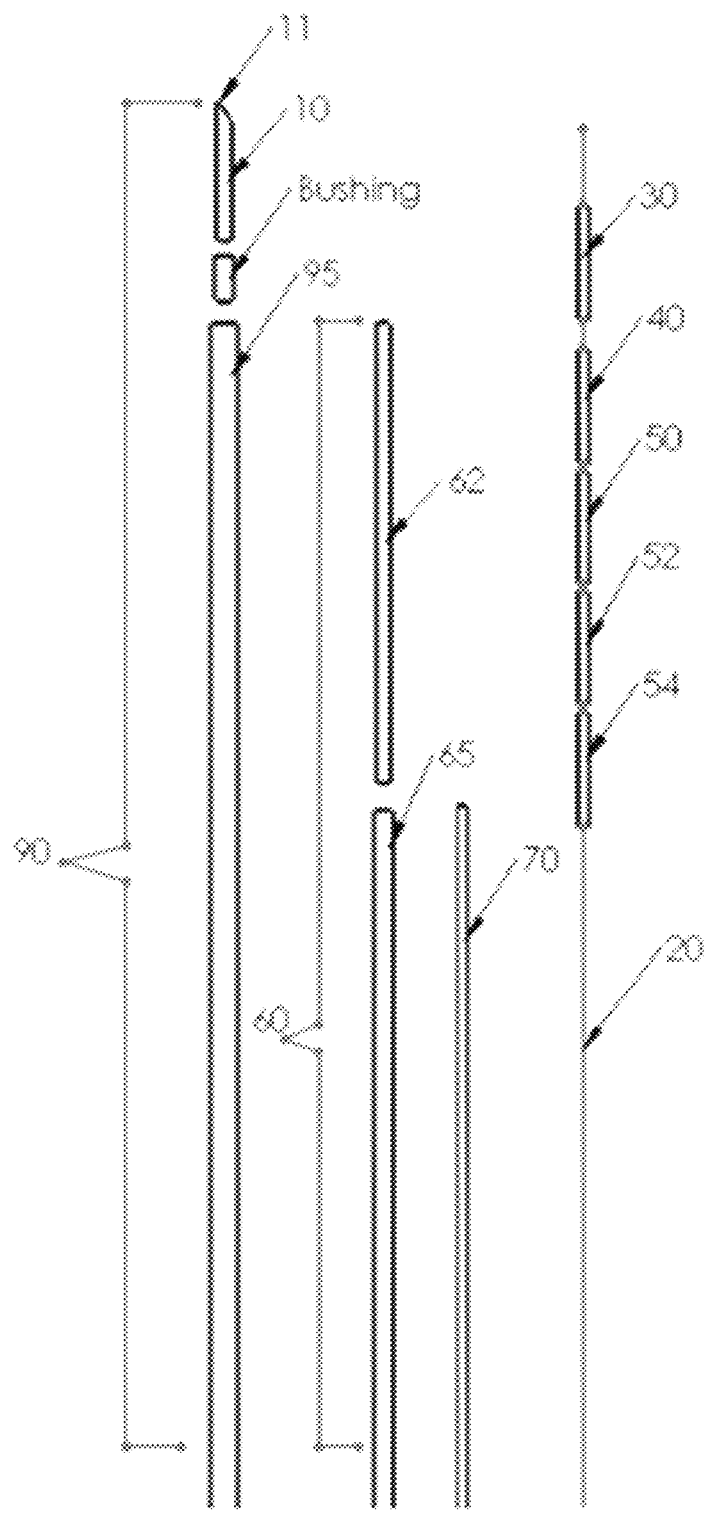
FIG. 11 shows embodiments of a delivery device with an outer tube, a first drive tube, a second drive tube, and an assembly of braided suture segments strung on a flexible filament.

FIG. 11 shows embodiments of an outer tube 90, a first drive tube 60, a second drive tube 70, and an assembly of braided suture segments strung on a flexible filament (e.g., suture) 20.

In some embodiments, the outer tube 90 is a single tube that includes a base outer tube 95, and a needle 10 having a needle point 11. In some embodiments, the single tube of the outer tube 90, may or may not have a bushing included. In some embodiments, the outer tube 90 may comprise a two-piece tube having a base outer tube 95 coupled with a needle 10. In some embodiments, the outer tube 90 may comprise a three-piece tube having the base outer tube 95 coupled with a bushing and the needle 10. In embodiments when the outer tube 90 comprises more than 1 part, the various parts may be fabricated from different rigid materials. In other embodiments when the outer tube 90 comprises more than 1 part, the various parts may be fabricated from similar rigid materials.

FIG. 11 also shows embodiments of the first drive tube 60. In some embodiments, the first drive tube 60 is a single tube. In some embodiments, the first drive tube 60 may comprise a two-piece tube having a base first drive tube 65, and a first drive tube tip 62. In embodiments when the first drive tube 60 comprises more than 1 part, the various parts may be fabricated from different rigid materials. In other embodiments when the first drive tube 60 comprises more than 1 part, the various parts may be fabricated from similar rigid materials.

FIG. 11 further shows embodiments of the second drive tube 70. The second drive tube 70 is made from rigid materials. The rigid materials may include one or more rigid materials, such as a steel, aluminum, titanium, and so on. The rigid material may also include metallic alloys such as nitinol.

FIG. 11 still further shows embodiments of the an assembly of five braided suture segments 30,40,50,52,54 with a flexible filament (e.g., suture) 20 threaded through bore holes that go through a length-wise dimension of the braided suture segments.

Figure 12:
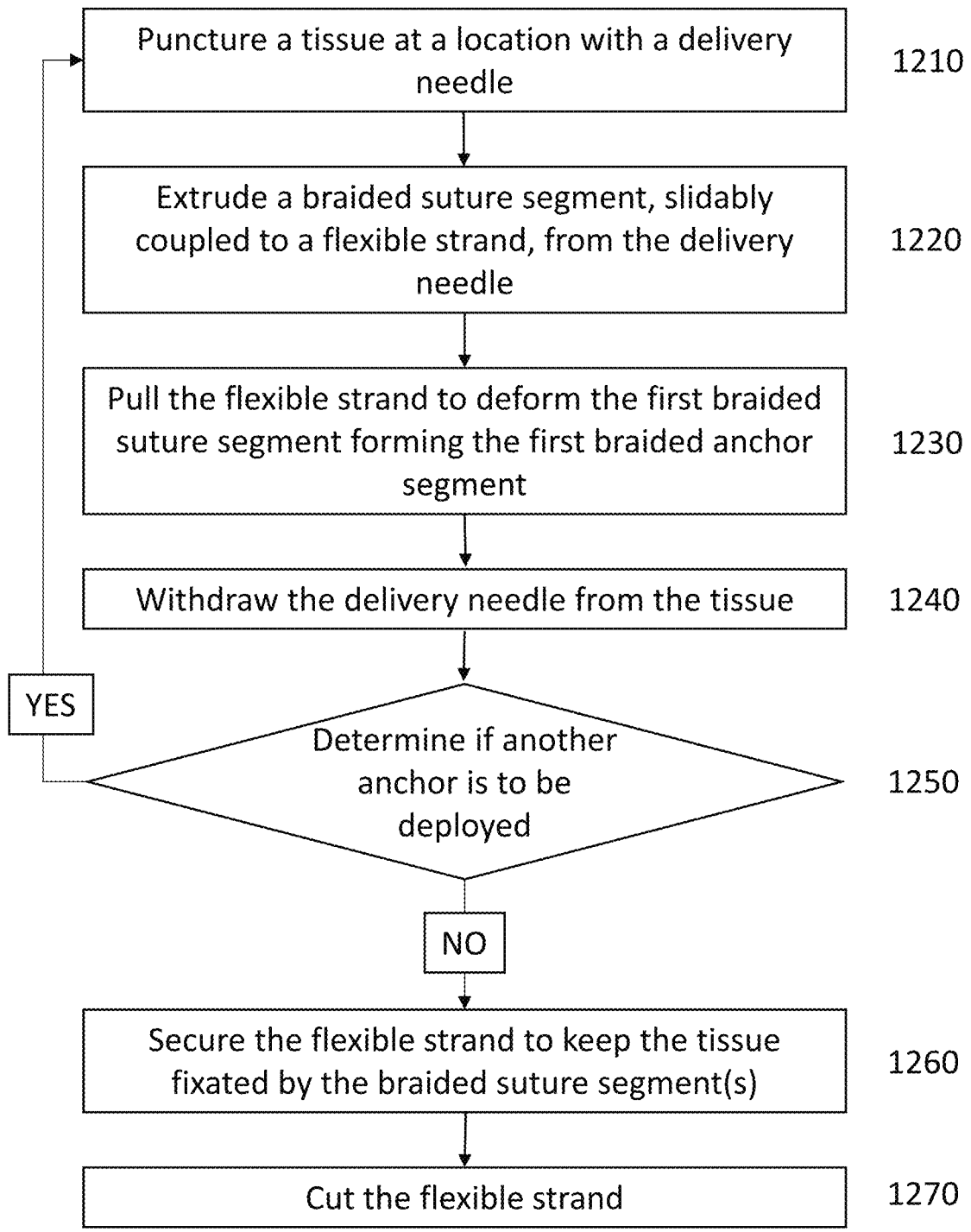
FIG. 12 shows steps of an embodiment of a method for implanting braided anchor segments connected via a single flexible strand for tissue fixation.

FIG. 12 shows steps of an embodiment of a method for implanting braided anchor segments connected via a single flexible strand (e.g., suture) for tissue fixation.

At 1210, puncture a tissue at a location with a delivery needle. The needle having a needle tip punctures the tissue from a proximal side of the tissue to a distal side of the tissue. The needle is at a distal end of an outer tube, and the outer tube is coupled to a handle assembly.

At 1220, extrude a braided suture segment, slidably coupled to a flexible strand, from the delivery needle. The braided suture segment is extruded from the needle on the distal side of the tissue. The braided suture segment is pushout distally out of the needle by a first drive tube.

At 1230, pull the flexible strand to deform the braided suture segment forming the braided anchor segment. As a result of the flexible strand being pulled tight, the first braided suture segment is deformed into a first braided anchor segment.

At 1240, withdraw the delivery needle from the tissue. The delivery needle is withdrawn from the tissue leaving behind the braided anchor segment on the distal side of the tissue.

At 1250, determine if another anchor is to be deployed. A determination is made as to whether an additional braided anchor segment is required to fixate the tissue. If it is determined that an additional braided anchor segment is necessary to fixate the tissue, then the method returns to step 1210 to initiate placing an additional braided anchor segment on the distal side of the tissue. If it is determined that an additional braided anchor segment is not necessary to fixate the tissue, then the method advances to step 1260 to secure the flexible strand.

At 1260, secure the flexible strand to keep the tissue fixated by the braided suture segment(s). The flexible strand (e.g., suture) is secured by engaging a locking mechanism (e.g., cinch) with the suture to lock the suture and prevent the fixated tissue from pulling apart. By tightening the suture to draw in the anchors and close the opening in the tissue, the flexible assembly braided anchor segments has closed the opening like pulling purse strings to close a purse.

At 1270, cut the suture. The flexible strand is cut on the distal side of the locking mechanism after the flexible strand has been pulled taut and secured by the locking mechanism.

Figure 13:
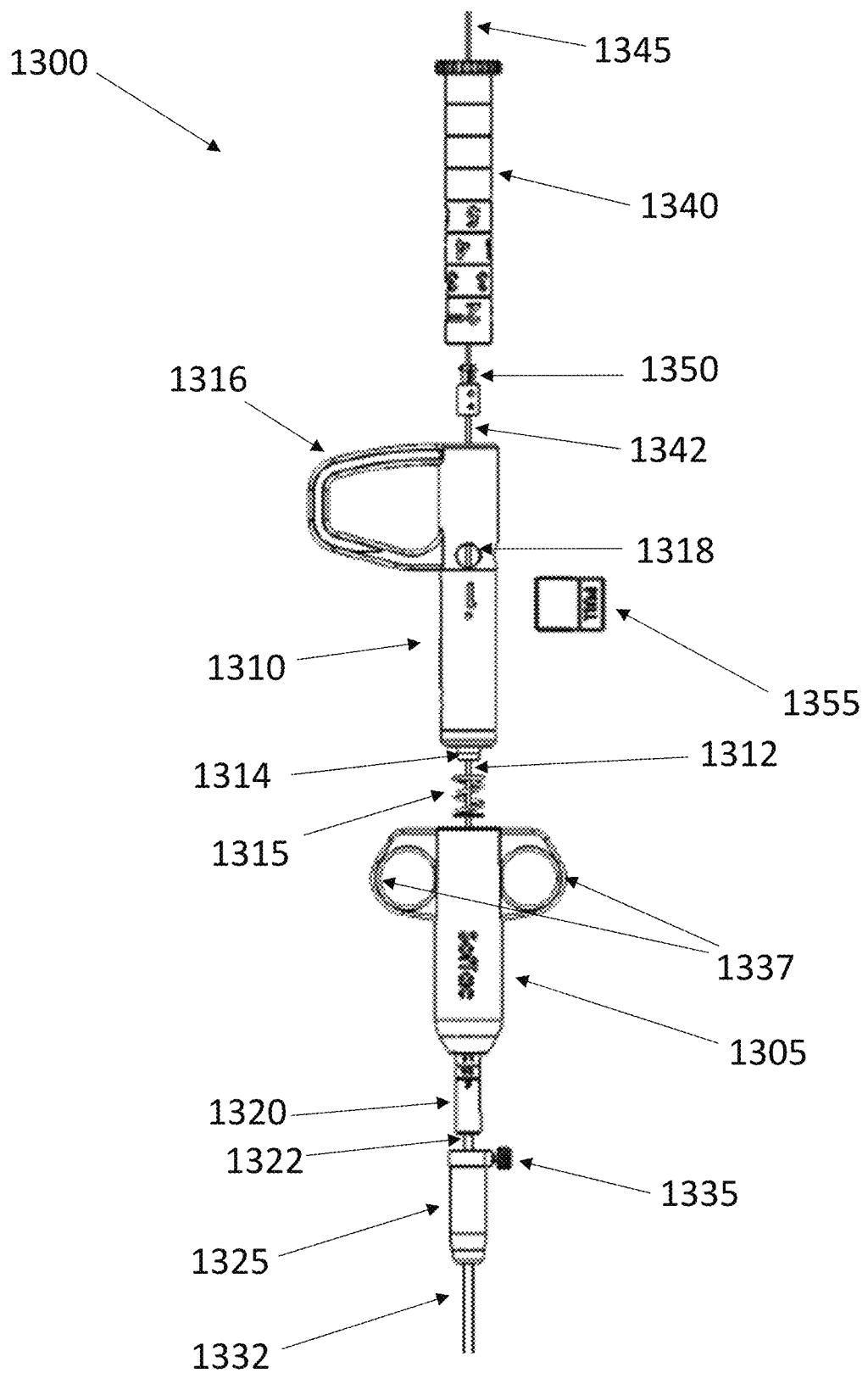
FIG. 13 shows a partially exploded view of another embodiment of a delivery device (e.g. closure device) in accordance with the present disclosure.

FIG. 13 shows a partially exploded view of another embodiment of a delivery device in accordance with the present disclosure. The delivery device 1300 (e.g. closure device) includes a first loop 1305 and a second loop 1310, the second loop having a second loop tip 1314. Together, the first loop 1305 and the second loop 1310 may be called a closure handle assembly of the closure device 1300. A nitinol inner tube 1312 runs through a concentric path though the first loop 1305 and the second loop 1310, and in particular its second loop tip 1314. Nitinol inner tube 1312 is connected to second loop tip 1314. The nitinol inner tube 1312 passes through a compression spring 1315. The compression spring 1315 provides a spring force between the first loop 1305 and the second loop 1310 acting to keep the first loop 1305 and the second loop 1310 apart. A second loop handle 1316 is located at a proximal portion of the second loop 1310. Furthermore, a ball plunger (not shown) is positioned near a distal portion of the second loop handle 1316, as is a window 1318. The window 1318 shows a count of the suture segments as they are extruded out of the closure device 1300.

The first loop 1305 of closure device 1300 (e.g., delivery device) has a first loop tip 1320 that has calibration marks to allow for reproducibly positioning outer sheath housing 1325 (e.g., sheath housing). The sheath housing 1325 is fixed into place on an peek outer tube 1322 with a thumb screw 1335 which threads through the sheath housing and tightens onto the first loop tip 1320. A peek outer tube 1322 passes through the first loop tip 1320 into the sheath housing 1325 and the outer sheath tube 1332 (e.g., outer sheath). The outer sheath tube 1332 may be formed of a transparent material, such as a plastic, a glass, or the like, or it may be formed from a metal material. At the distal end of the outer tube 1322 is a needle 1328 with a needle tip (not shown) that is the leading edge of the outer tube 1322 and needle 1328 for puncturing a tissue surface (not shown). In embodiment, the peek outer tube 1322, the needle 1328, and the needle tip 1410 may be formed from a single piece of material. That material may be a metal, or a plastic. The peek outer tube 1322, the needle 1328, and the needle tip 1410 may be formed from different materials, and they may be interchangeable for other corresponding parts. Furthermore, a ball plunger (not shown) is positioned in a proximal portion of the first loop 1305 near the first loop rings 1337. The first loop 1305 may be fabricated from a metal, plastic, or some other moldable material.

The nitinol inner tube 1312 is positioned in outer tube 1322 and is aligned concentrically with the outer tube 1322.

A third drive 1340 is coupled to inner drive tube 1342 by bushing 1350. Inner drive tube 1342 is positioned in nitinol inner tube 1312 and is aligned concentrically with nitinol inner tube 1312. A monofilament suture 1345 is shown coming out of the proximal end of the third drive 1340, and a safety pull 1355 is also shown. The third drive 1340 may also be called a back plunger 1340.

FIG. 14A through FIG. 30B illustrate the use of an embodiment of the closure device to provide a flexible braided anchor assembly for tissue fixation according to one embodiment of the present disclosure. When figure identifiers with the same numbers are incorporated in FIGS. 14A-30B as they are in FIG. 13, they indicate similar items and parts of the closure 1300 shown in FIG. 13.

Figure 14A:
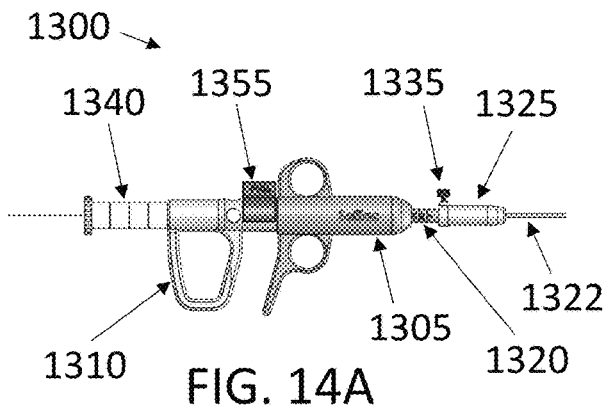
FIG. 14A shows a side view of another embodiment of the closure device in a starting position with a needle in accordance with the present disclosure.

FIG. 14A shows a side view of another embodiment of the closure device 1300 in a starting position in accordance with the present disclosure. The safety tab 1355 is in position between the first loop 1305 and the second loop 1310, and the sheath housing 1325 with the outer sheath (not shown) are positioned in a distal position on the first loop tip 1320. The peek outer tube 1322 is shown extending from the sheath housing 1325.

Figure 14B:
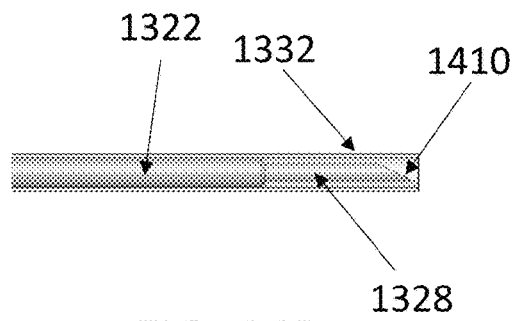
FIG. 14B shows a schematic cross section illustration of another embodiment of the closure device in a starting position for the needle in accordance with the present disclosure.

FIG. 14B shows a schematic cross section illustration of the closure device 1300 in a starting position with the outer sheath 1332 extended over the peek outer tube 1322, the needle 1328, and the needle tip 1410. In this embodiment, the needle 1328 and the needle tip 1410 are formed from one material and positioned in the peek outer tube 1322.

Figure 15A:
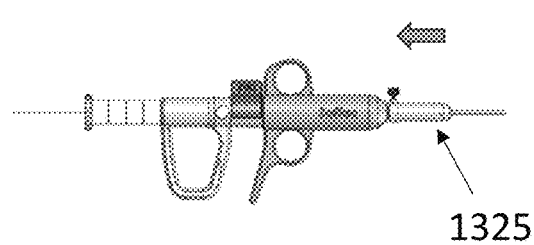
FIG. 15A shows a side view of another embodiment of the closure device with the needle adjusted for use and the thumb screw tightened in accordance with the present disclosure.

FIG. 15A shows a side view of the closure device 1300 being prepared for use by retracting the sheath housing 1325, and tightening the thumb screw 1335 to fix the sheath housing 1325 in place.

Figure 15B:
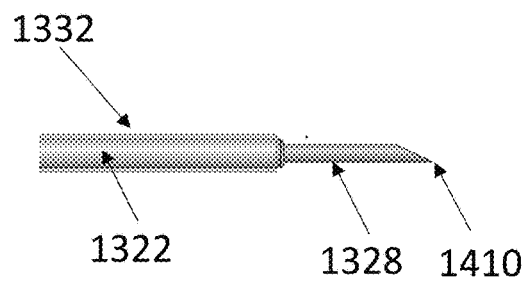
FIG. 15B shows a schematic cross section illustration of another embodiment of the closure device with the needle adjusted in accordance with the present disclosure.

FIG. 15B shows a schematic cross section illustration of the closure device 1300 with the needle 1328 and needle tip 1410 exposed when the outer sheath 1332 is retracted over the peek outer tube 1322 to determine a needle 1328 depth.

Figure 16A:
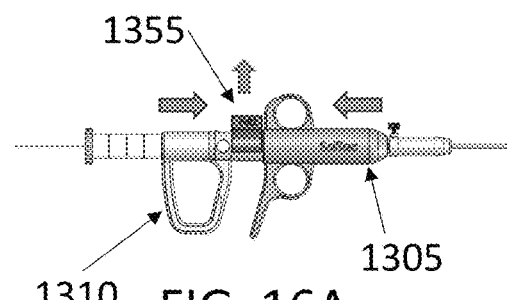
FIG. 16A shows a side view of another embodiment of the closure device with a safety being removed in accordance with the present disclosure.

FIG. 16A shows a side view of the closure device 1300 with the safety pull 1355 being removed from between the first loop 1305 and the second loop 1310. After the safety pull 1355 is removed, first loop 1305 and the second loop 1310 remain in the same position. With the first loop 1305 and the second loop 1310 spaced apart the width of the safety pull 1355, the peek outer tube 1322 and needle tip 1410 are pressed into a tissue to puncture it. This is a relaxed position for the closure device.

Figure 16B:
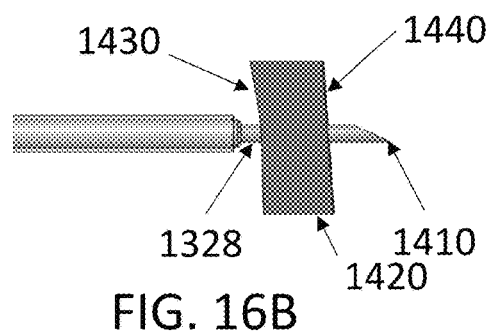
FIG. 16B shows a schematic cross section illustration of a closure device with a needle after puncturing tissue according to an embodiment of the present disclosure.

FIG. 16B shows a schematic cross section illustration of the closure device 1300 showing the needle 1328 and needle tip 1410 after puncturing tissue 1420 through the proximal side 1430 of the tissue 1420 to the distal side 1440 of the tissue 1420.

Figure 17A:
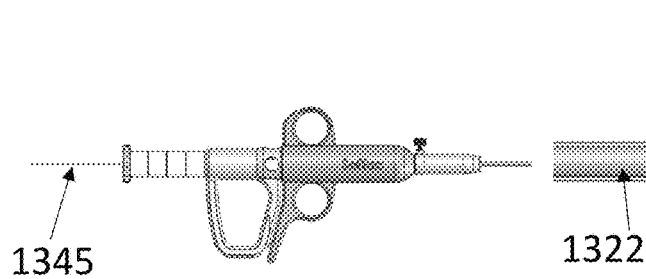
FIG. 17A shows a side view of another embodiment of the closure device in accordance with the present disclosure.

FIG. 17A shows a side view of the closure device 1300 after the first loop 1305 and the second loop 1310 have been brought together by squeezing the first loop rings 1337 and the second loop handle 1316 together. Squeezing the first loop 1305 and the second loop 1310 together extrudes a first braided suture segment 1450 from the needle tip 1410.

Figure 17B:
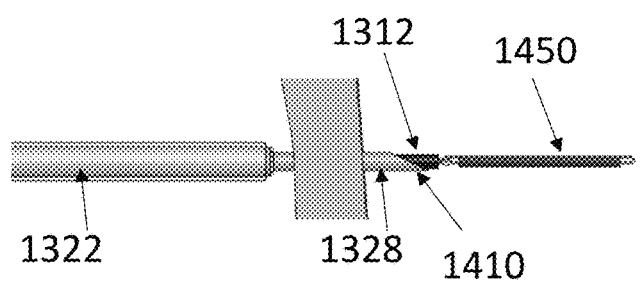
FIG. 17B shows a schematic cross section illustration of a closure device with a first braided suture segment after being extruded from the needle on the distal side of the tissue.

FIG. 17B shows a schematic cross section illustration of the closure device 1300 after the first loop 1305 and the second loop 1310 have been brought together by squeezing the first loop rings 1337 and the second loop handle 1316 to bring the first loop 1305 and the second loop 1310 together. Squeezing the first loop 1305 and the second loop 1310 together extrudes the first braided suture segment 1450 from the needle tip 1410 on the distal side of the tissue 1440. The first braided suture segment 1450 is forced from the from the needle tip 1410 by the nitinol inner tube 1312 (e.g., compensator). The nitinol inner tube 1312 is positioned concentrically inside of peek outer tube 1322 and provides pressure to force the first braided suture segment 1450 to force the first braided suture segment 1450 out of the peek outer tube 1322. The compensator 1312 extends out of the needle tip 1410 upon squeezing the first loop 1305 and the second loop 1310 together.

Referring to FIG. 10, the nitinol inner tube 1312 corresponds to first drive tube 60 that applies pressure to the first braided suture segment 30. The nitinol inner tube 1312 may be fabricated from a metal, such as nitinol, stainless steel, nickel, titanium, and the like. The nitinol inner tube 1312 and the first drive tube may also be referred to as a compensator. The compensator (e.g., nitinol inner tube) 1312 remains in place after extrusion of the first braided suture segment 1450 from the peek outer tube 1322 to protect the suture segment (e.g., flexible strand) 1345 from the sharp, beveled edge of the needle tip 1410.

The compensator 1312 remains extended outside of the needle tip 1410 as long as the first loop 1305 and the second loop 1310 are held together. The compression spring 1315 applies an opposing force between the first loop 1305 and the second loop 1310 to keep them apart, but the position of the compensator is controlled by a user manually. It is a surprising result that the location of the compensator inside of the needle and needle tip, and the ability to control the position of the compensator prevents the suture from being severed accidently by the needle 1410. In this way, the compensator is not allowed to snap back away from the implant automatically.

Figure 18A:
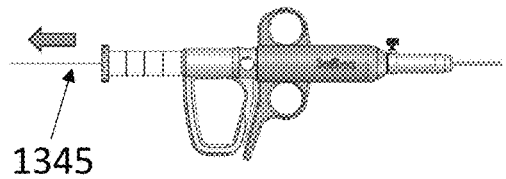
FIG. 18A shows a side view of another embodiment of the closure device with the suture being pulled taut a first time in accordance with the present disclosure.

FIG. 18A shows a side view of the closure device 1300 closure device with the suture 1345 being pulled taut a first time in accordance with the present disclosure.

Figure 18B:
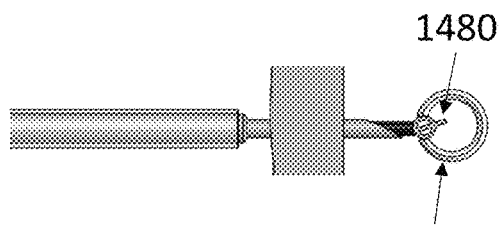
FIG. 18B shows a schematic cross section illustration of a closure device with a first braided anchor segment after the suture has been pulled taut a first time to form a suture loop track.

FIG. 18B shows a schematic cross section illustration of a closure device 1300 with a first braided anchor segment 1450 after the suture 1345 has been pulled taut a first time to form a suture loop track 1470. The suture loop track 1470 has a sliding slip knot 1480 that corresponds to sliding slip knot 22 in FIG. 10. The sliding slip knot 1480,22 is a part of suture loop track 1470 that is positioned to be the first suture segment to be delivered. As such, it is a primary braided suture segment, because the sliding slip knot 1480 is placed proximally to the first braided suture segment 1450 to allow it to participate in anchoring the primary suture segment 1450 on the distal side of the tissue.

Figure 19A:
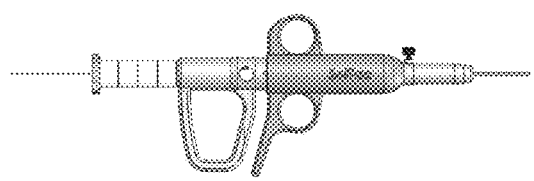
FIG. 19A shows a side view of another embodiment of the closure device with a relaxed handle in accordance with the present disclosure.

FIG. 19A shows a side view of the closure device 1300 with a relaxed closure handle assembly after it is removed from the tissue 1420. The closure handle assembly is relaxed when there is no active squeezing or pulling apart of the first loop 1305 and the second loop 1310.

Figure 19B:
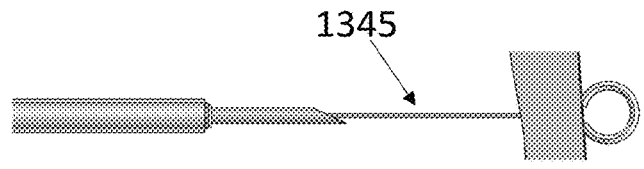
FIG. 19B shows a schematic cross section illustration of a closure device with the needle being removed from the tissue and with the suture being left slack in a second location.

FIG. 19B shows a schematic cross section illustration of a closure device 1300 with the needle being removed from the tissue and with the suture 1345 being left slack in a second location.

Figure 20A:
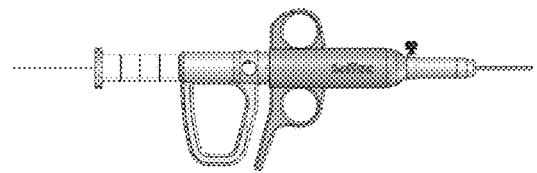
FIG. 20A shows a side view of another embodiment of the closure device being approximated for puncturing tissue in accordance with the present disclosure.

FIG. 20A shows a side view of the closure device 1300 being approximated for puncturing the tissue 1420 in a second location. The suture 1345 is left slack to allow the closure device 1300 to be properly positioned for puncturing the tissue 1420.

Figure 20B:
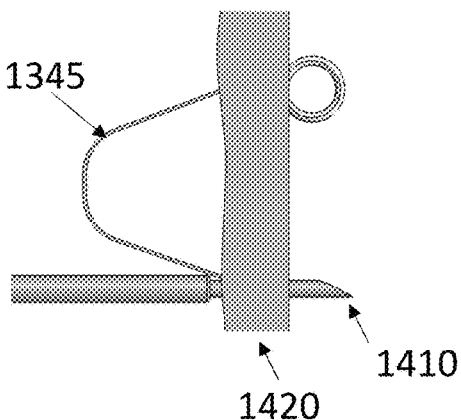
FIG. 20B shows a schematic cross section illustration of a closure device with the needle after puncturing the tissue in a second location.

FIG. 20B shows a schematic cross section illustration of a closure device 1300 with the needle tip 1410 after puncturing the tissue 1420 in a second location.

Figure 21A:
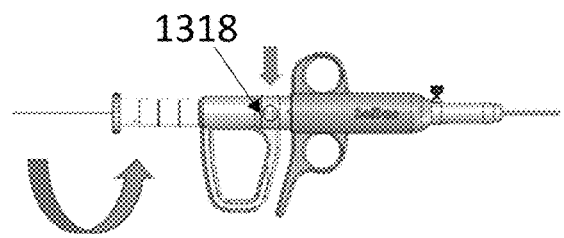
FIG. 21A shows a side view of another embodiment of the closure device with the back plunger being rotated 90 degrees counterclockwise until stopping with the number "2" showing in a window in accordance with the present disclosure.

FIG. 21A shows a side view of the closure device 1300 with the third drive 1340 (e.g., back plunger) being rotated 90 degrees counterclockwise until stopping with the number "2" showing in a window 1318. The curved arrow in FIG. 21A indicates the counterclockwise turning of the back plunger 1340. The window 1318 keeps track of the number of braided suture segments that have been extruded from the closure device 1300, starting at the number 2 showing before the second braided suture segment has been deployed. The short arrow in FIG. 21A indicates the location of the window 1318 on the second loop 1310.

Figure 21B:
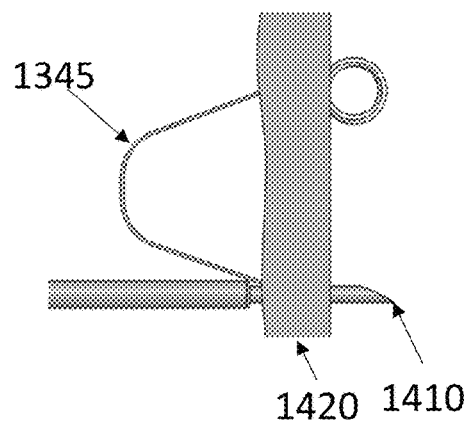
FIG. 21B shows a schematic cross section illustration of a closure device with the needle after puncturing the tissue in a second location.

FIG. 21B shows a schematic cross section illustration of a closure device 1300 with the needle tip 1410 on the distal side of the tissue 1420 after puncturing the tissue 1420 in a second location.

Figure 22A:
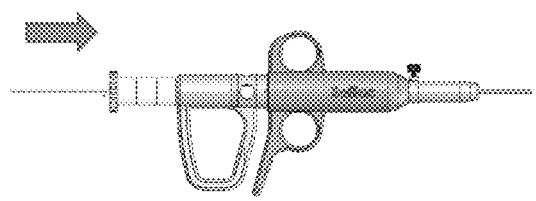
FIG. 22A shows a side view of another embodiment of the closure device with the back plunger being advanced in accordance with the present disclosure.

FIG. 22A shows a side view of the closure device 1300 with the back plunger 1340 being advanced to extrude a second braided suture segment.

Figure 22B:
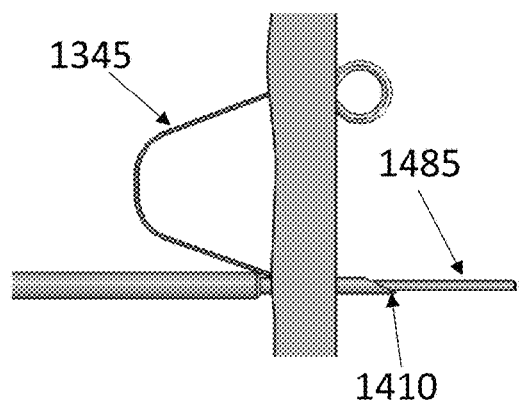
FIG. 22B shows a schematic cross section illustration of a closure device with the with a second braided suture segment after being extruded from the needle on the distal side of the tissue in a second location.

FIG. 22B shows a schematic cross section illustration of the closure device 1300 with a second braided suture segment 1485 after being extruded from the needle tip 1410 on the distal side of the tissue 1420 in a second location. The second braided suture segment 1485 is pushed out of the nitinol inner tube 1312 by inner drive tube 1342. The inner drive tube 1342 has a smaller outer diameter than the inner diameter of the nitinol inner tube 1312, and corresponds to second drive tube 70. The inner drive tube 1342 pushes the remaining braided suture segments out of the nitinol inner tube 1312 in succession following the deployment of the first braided suture segment.

Figure 23A:
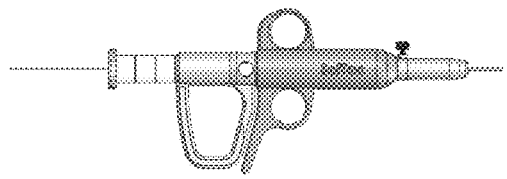
FIG. 23A shows a side view of another embodiment of the closure device with the handle being squeezed in accordance with the present disclosure.

FIG. 23A shows a side view of the closure device 1300 with the closure handle assembly being squeezed to fully deploy the implant 1485 (e.g. second braided suture segment).

Figure 23B:
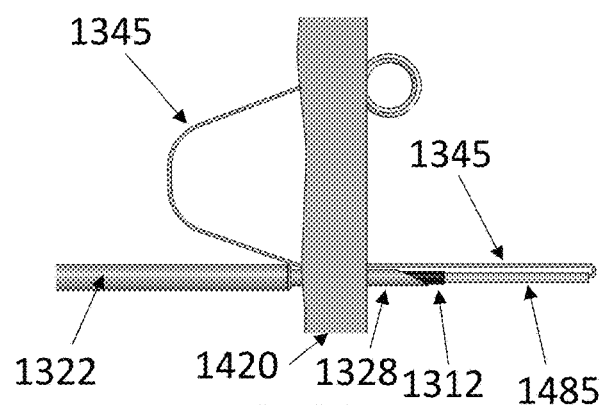
FIG. 23B shows a schematic cross section illustration of a closure device with the with a second braided suture segment after being extruded from the needle with the compensator on the distal side of the tissue in a second location.

FIG. 23B shows a schematic cross section illustration of the closure device 1300 with the second braided suture segment 1485 after being extruded from the nitinol inner tube 1312 and ultimately out of the needle with the compensator 1490 on the distal side of the tissue in a second location. The suture 1345 is shown doubling back toward the tissue 1420. The second braided suture segment 1485 is pushed out of the nitinol inner tube 1312 by the inner drive tube 1342 while the nitinol inner tube 1312 is extended out of the peek outer tube 1322.

Figure 24A:
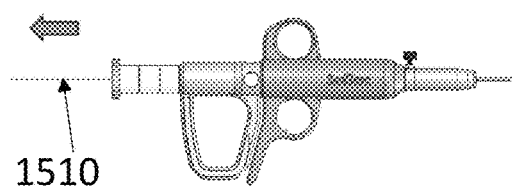
FIG. 24A shows a side view of another embodiment of the closure device with the suture being pulled taut a second time in accordance with the present disclosure.

FIG. 24A shows a side view of the closure device 1300 with the portion of the suture 1510 being pulled taut, indicated by the short arrow, a second time to form a second suture loop track.

Figure 24B:
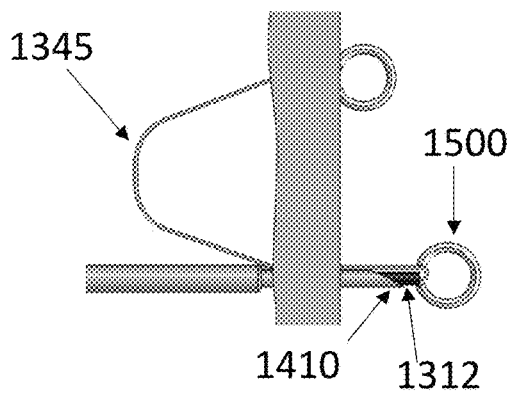
FIG. 24B shows a schematic cross section illustration of a closure device with a second braided anchor segment after the suture has been pulled taut a second time to form a second suture loop track.

FIG. 24B shows a schematic cross section illustration of the closure device 1300 with a second braided anchor segment after the suture has been pulled taut a second time to form a second suture loop track 1500. The compensator 1312 is still positioned with a portion of its length outside of the needle tip 1410 to prevent the needle from severing the suture 1345.

Figure 25A:
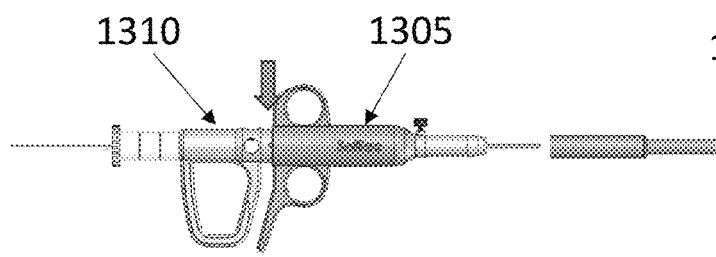
FIG. 25A shows a side view of another embodiment of the closure device with a relaxed handle in accordance with the present disclosure.

FIG. 25A shows a side view of the closure device 1300 with a relaxed closure handle assembly while the needle is being removed from the tissue. Note a small gap between the first loop 1305 and the second loop 1310 indicated by the short arrow.

Figure 25B:
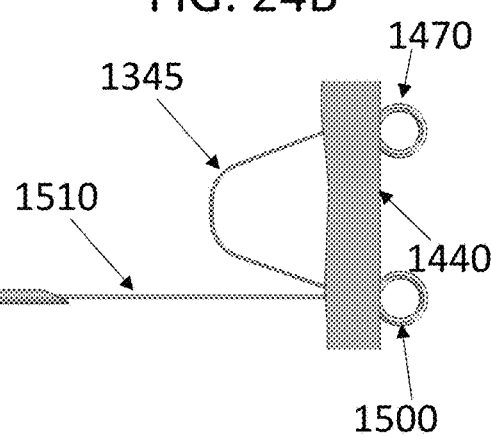
FIG. 25B shows a schematic cross section illustration of a closure device with the needle being removed from the tissue and with the suture being left slack at a third location.

FIG. 25B shows a schematic cross section illustration of the closure device 1300 with the needle being removed from the tissue, and the second suture loop track 1500 is being pulled against the distal side 1440 of the tissue. The portion of suture 1345 between the first suture loop track 1470 and second suture loop track 1500 is left slack while the needle is brought out of the tissue and the second suture loop track 1500 is secured against the distal side 1440 of the tissue.

Figure 26A:
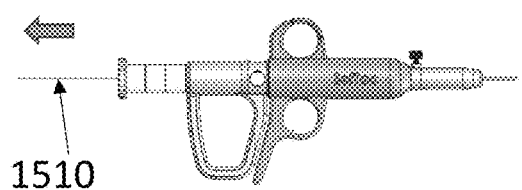
FIG. 26A shows a side view of another embodiment of the closure device with a squeezed handle to re-engage the closure device in accordance with the present disclosure.

FIG. 26A shows a side view of the closure device 1300 with a squeezed closure handle assembly to re-engage the closure device with the suture 1510. Note that the small gap visible in FIG. 25A is closed on the squeezing of the first loop 1305 and the second loop 1310 together.

Figure 26B:
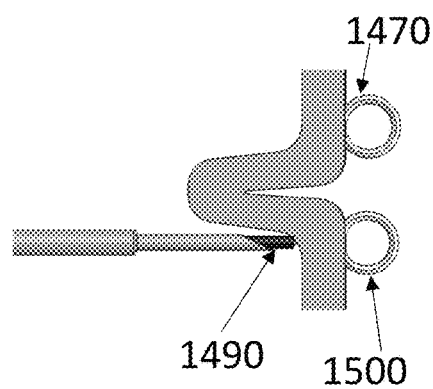
FIG. 26B shows a schematic cross section illustration of a closure device after the handle is squeezed and the compensator is extended beyond the needle.

FIG. 26B shows a schematic cross section illustration of the closure device 1300 after the closure handle assembly is squeezed and the compensator is extended beyond the needle to retract the suture 1510 to cinch the first suture loop track 1470 and second suture loop track 1500 to pull the loop tracks together. By pulling the first suture loop track 1470 and second suture loop track 1500 together, the distal surfaces of adjacent portions of the tissue are brought together to facilitate healing of the tissue.

FIG. 27A shows a side view of the closure device 1300 being approximated for puncturing the tissue in a third location.

FIG. 27B shows a schematic cross section illustration of a closure device 1300 with the needle tip 1410 after puncturing the tissue 1420 in a third location. The suture 1510 is left slack to allow the closure device 1300 to be properly positioned for puncturing the tissue 1420.

FIG. 28A shows a side view of the closure device 1300 with the third drive 1340 (e.g., back plunger) being rotated 90 degrees counterclockwise until stopping with the number "3" showing in a window 1318. The curved arrow in FIG. 28A indicates the counterclockwise turning of the back plunger 1340. The window 1318 keeps track of the number of braided suture segments that have been extruded from the closure device 1300. The number "3" shows before the third braided suture segment has been deployed. The short arrow in FIG. 28A indicates the location of the window 1318 on the second loop 1310.

FIG. 28B shows a schematic cross section illustration of a closure device 1300 with the needle tip 1410 on the distal side of the tissue 1420 after puncturing the tissue 1420 in a third location.

Figure 29A:
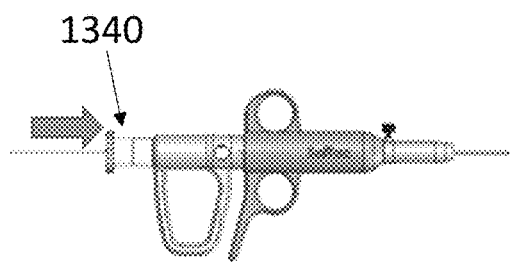
FIG. 29A shows a side view of another embodiment of the closure device with the back plunger being advanced until stop in accordance with the present disclosure.

FIG. 29A shows a side view of the closure device 1300 with the back plunger 1340 being advanced to extrude a third braided suture segment.

Figure 29B:
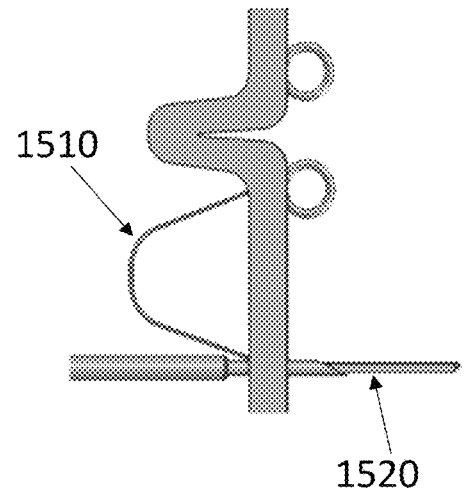
FIG. 29B shows a schematic cross section illustration of a closure device with the third braided suture segment after being extruded from the needle on the distal side of the tissue in a second location.

FIG. 29B shows a schematic cross section illustration of the closure device 1300 with a third braided suture segment 1520 after being extruded from the nitinol inner tube 1312 by inner drive tube 1342, and ultimately out of the needle tip 1410 on the distal side of the tissue 1420 in a third location.

Figure 30A:
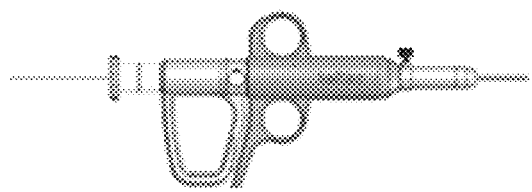
FIG. 30A shows a side view of another embodiment of the closure device with the handle being squeezed in accordance with the present disclosure.

FIG. 30A shows a side view of the closure device 1300 with the handle being squeezed to fully deploy the implant 1520 (e.g. third braided suture segment).

Figure 30B:
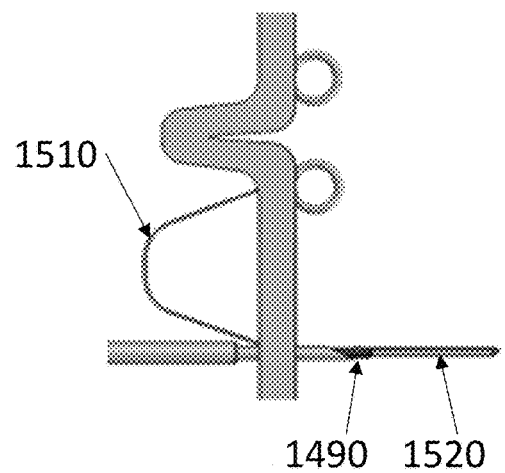
FIG. 30B shows a schematic cross section illustration of a closure device with the second braided suture segment after being extruded from the needle with the compensator on the distal side of the tissue in a second location.

FIG. 30B shows a schematic cross section illustration of the closure device 1300 with the third braided suture segment 1520 after being extruded from the nitinol inner tube 1312 and ultimately from the needle. The compensator 1490 is shown on the distal side of the tissue in the third location.

Figure 31A:
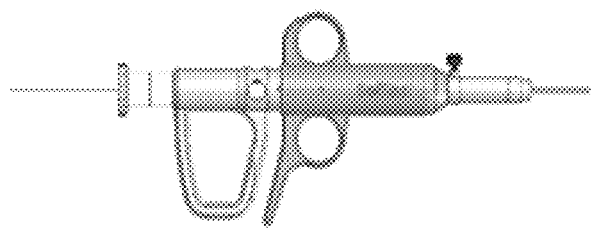
FIG. 31A shows a side view of another embodiment of the closure device with the handle being squeezed in accordance with the present disclosure.

FIG. 31A shows a side view of the closure device 1300 with a relaxed closure handle assembly while the needle is being removed from the tissue.

Figure 31B:
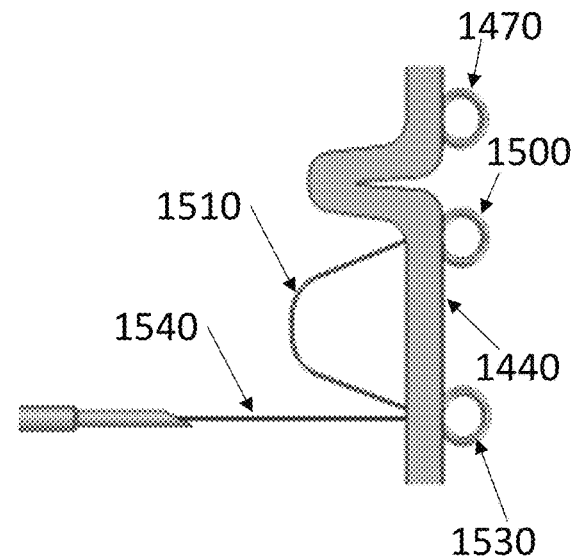
FIG. 31B shows a schematic cross section illustration of a closure device with the needle being removed from the tissue and with the suture being left slack at a third location.

FIG. 31B shows a schematic cross section illustration of the closure device 1300 with the needle being removed from the tissue, and the third suture loop track 1530 is being pulled against the distal side 1440 of the tissue. The portion of suture 1510 between the second suture loop track 1500 and third suture loop track 1530 is left slack while the needle is brought out of the tissue and the third suture loop track 1530 is secured against the distal side 1440 of the tissue.

Figure 32A:
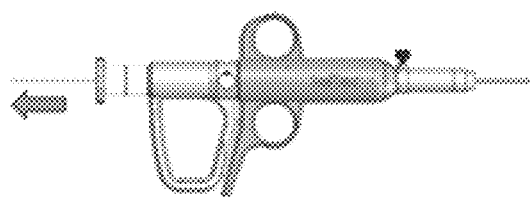
FIG. 32A shows a side view of another embodiment of the closure device with a relaxed handle in accordance with the present disclosure.

FIG. 32A shows a side view of the closure device 1300 with a squeezed closure handle assembly to re-engage the closure device with the suture 1540.

Figure 32B:
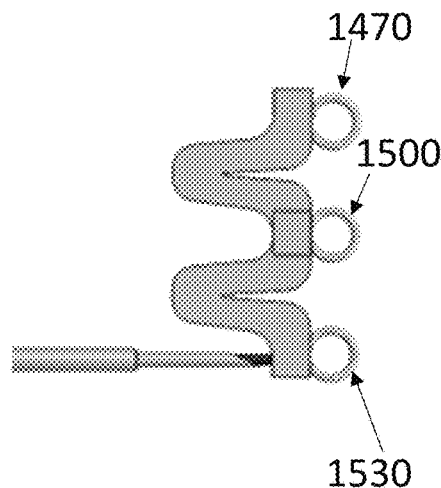
FIG. 32B shows a schematic cross section illustration of a closure device with a third braided anchor segment after the suture has been pulled taut a third time to form a third suture loop track.

FIG. 32B shows a schematic cross section illustration of the closure device 1300 after the closure handle assembly is squeezed and the compensator is extended beyond the needle to retract the suture 1540 to cinch the second suture loop track 1500 and third suture loop track 1530 to pull the loop tracks together. The second suture loop track 1500 and third suture loop track 1530 are brought together. Thus, the first, second, and third suture loop tracks are pulled together so that the distal surfaces adjacent to the loop tracks are brought together to facilitate healing of the tissue. The compensator 1490 is still positioned with a portion of its length outside of the needle tip 1410 to prevent the needle from severing the suture 1345.

Figure 33A:
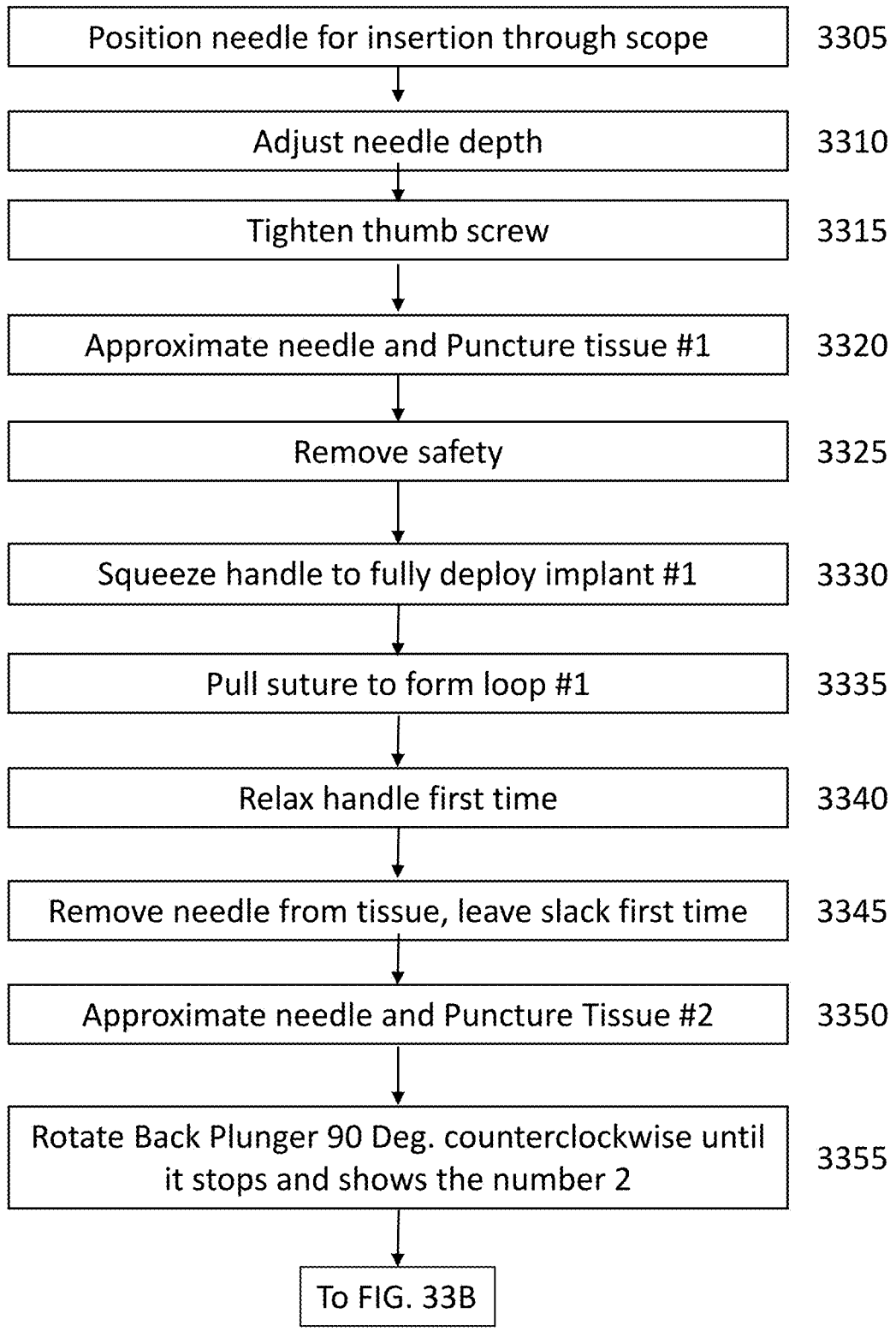
FIG. 33A shows steps of an embodiment of a method for implanting braided anchor segments connected via a single flexible strand for tissue fixation.
Figure 33B:
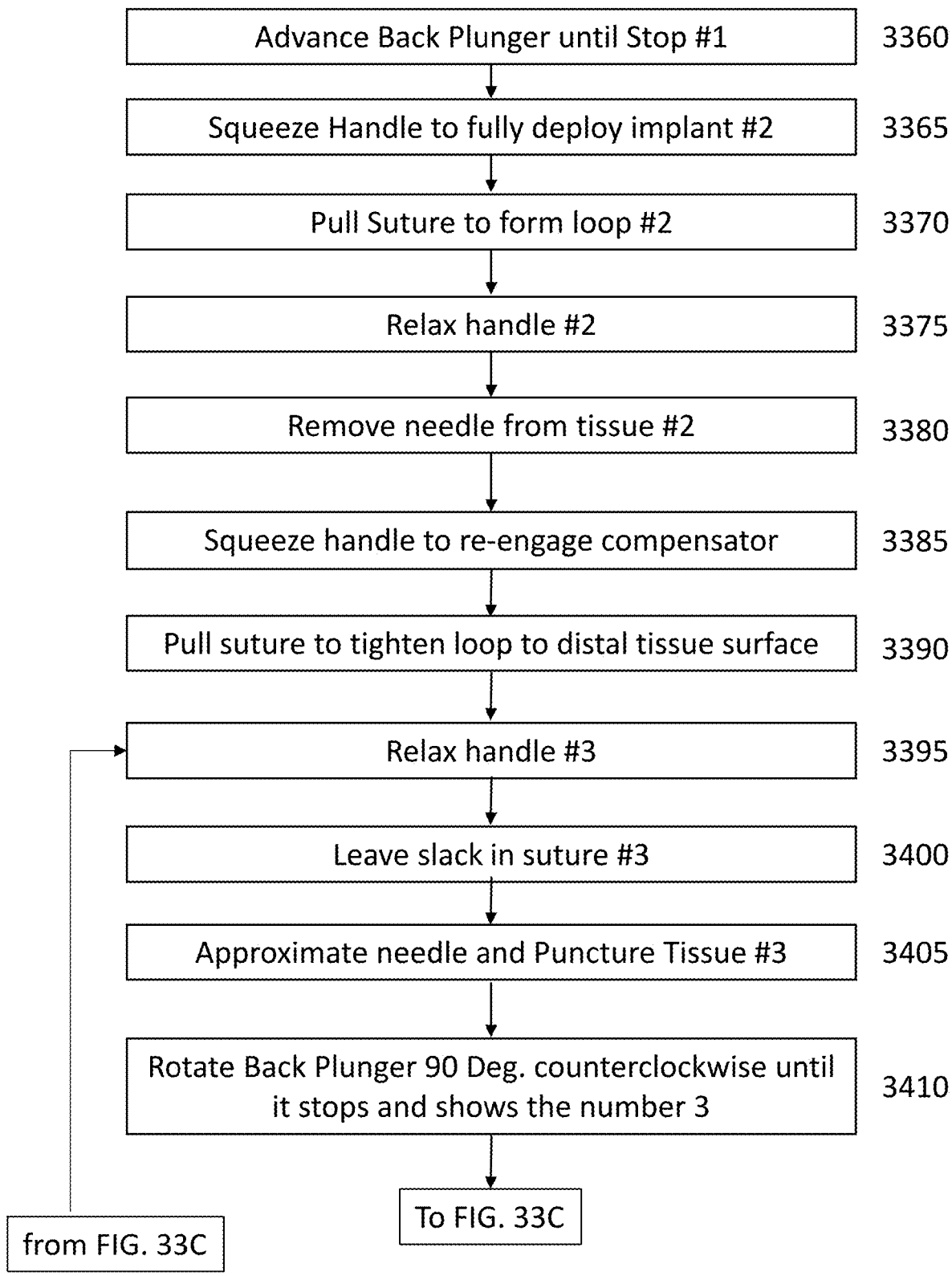
FIG. 33B shows more steps of an embodiment of a method for implanting braided anchor segments connected via a single flexible strand for tissue fixation.
Figure 33C:
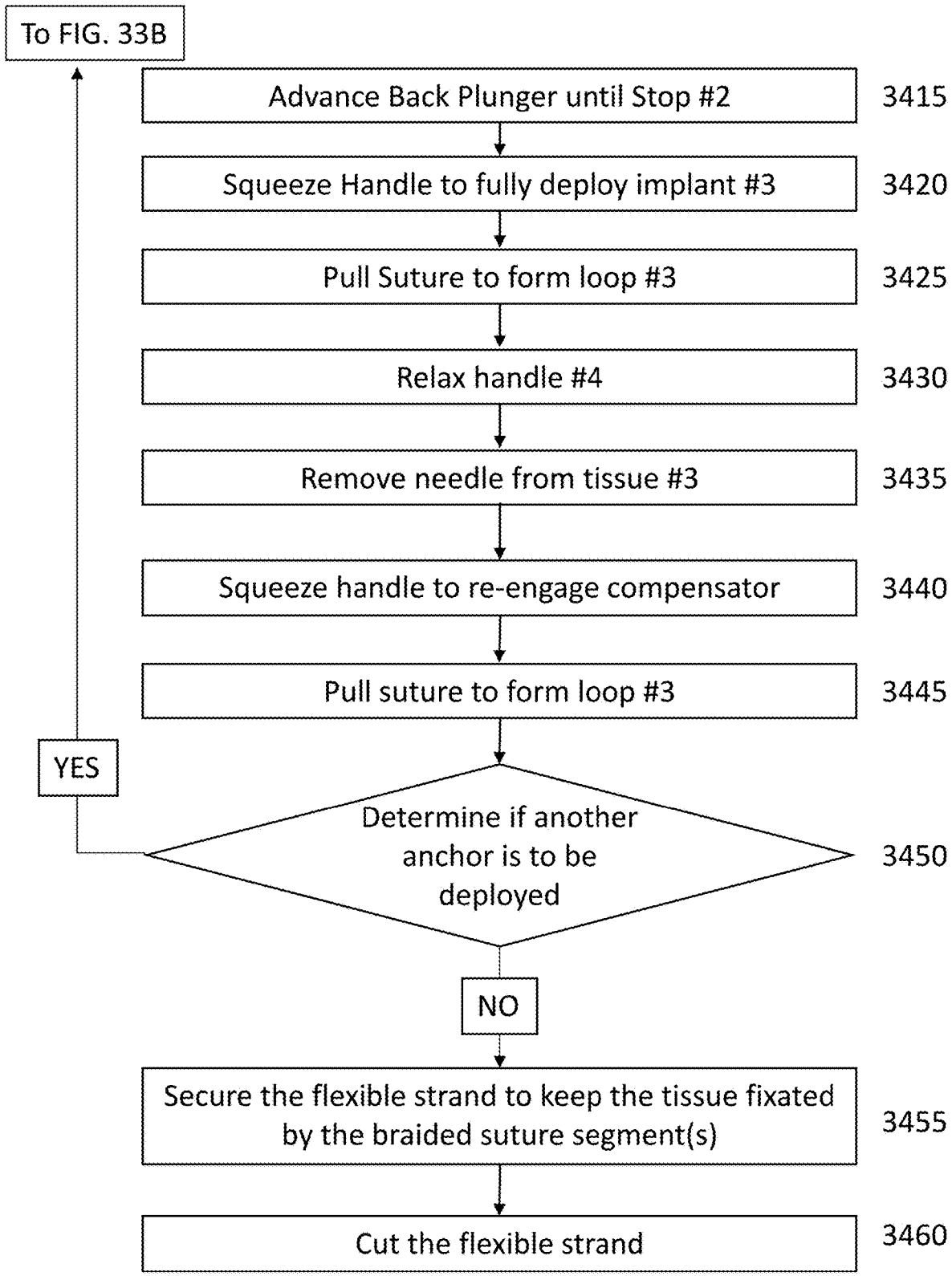
FIG. 33C shows even more steps of an embodiment of a method for implanting braided anchor segments connected via a single flexible strand for tissue fixation.

FIGS. 33A through 33C shows the steps of a method to use another closure device to method for implanting a plurality of braided suture segments connected via a single flexible strand for tissue fixation.

At step 3305, a needle tip 1410 is positioned for insertion through a scope. At the start of a process of implanting a series of braided suture segments, the needle tip 1410 is positioned over the tissue that is to be sutured.

At step 3310, the needle tip 1410 depth is adjusted. The depth of penetration of the needle can be set by adjusting the sheath housing 1325 to the desired depth.

At step 3315, the thumb screw 1335 is tightened. After the needle depth is adjusted (e.g. step 3310), then the sheath housing 1325 locked at that depth by tightening the thumb screw 1335.

At step 3320, the needle tip 1410 is approximated and the tissue is punctured a first time. The needle is positioned (e.g., approximated) above the tissue at the location that will be punctured.

At step 3325, a safety pull 1355 is removed. The safety pull 1355 is removed from the closure device 1300 so that the first loop 1305 and the second loop 1310 can be brought together. In some embodiments, the first loop 1305 and the second loop 1310 may be referred to as the closure handle assembly.

At step 3330, the closure handle assembly is squeezed to fully deploy implant number 1 (e.g., #1). The first braided suture segment 1450 (e.g., implant number 1) is extruded out of the needle by squeezing the closure handle assembly.

At step 3335, the suture 1345 is pulled to form the first loop. By pulling the suture, the extruded first braided suture segment 1450 is coiled into the first loop (e.g., suture loop track 1470).

At step 3340, the closure handle assembly is relaxed a first time.

At step 3345, the needle is removed from the tissue and slack is left in the suture for the first time. The needle is pulled back from the tissue, pulling the first suture loop track 1470 of the braided suture segment against the distal surface of the tissue. Slack is left in the suture so that the needle can be approximated in the next step.

At step 3350, the needle tip 1410 is approximated and the tissue is punctured a second time. The needle is positioned (e.g., approximated) above the tissue at the second location that will be punctured.

At step 3355, the back plunger 1340 is rotated 90 degrees counterclockwise until the plunger 1340 stops rotating and shows the number 2. After rotating the back plunger 1340, the number 2 will show in the window 1318 on the second loop 1310. This indicates that a second implant is in position to be deployed.

At step 3360, the back plunger 1340 is advanced until it stops. Advancing the back plunger extrudes the second implant (e.g., second braided suture segment 1485) out of the needle.

At step 3365, the closure handle assembly is squeezed to fully deploy implant number 2, the second braided suture segment 1485. Squeezing the closure handle assembly forces the compensator 1490 out of the needle. The compensator 1490 prevents the needle from cutting or damaging the suture or the braided suture segment.

At step 3370, the suture is pulled to form a second loop (e.g., a second suture loop track 1500). The second braided suture segment is formed into a second suture loop track 1500 that prevents the braided suture segment from being pulled back through the tissue.

At step 3375, the closure handle assembly is relaxed a second time.

At step 3380, the needle is removed from the tissue a second time.

At step 3385, the closure handle assembly is squeezed to re-engage the compensator.

At step, 3390, the suture is pulled to tighten the loop against the distal tissue surface.

At step 3395, the closure handle assembly is relaxed a third time.

At step 3400, slack is left in the suture.

At step 3405, the needle is approximated and punctures the tissue a third time.

At step 3410, the back plunger is rotated 90 degrees counterclockwise until the plunger stops rotating and shows the number 3. After rotating the back plunger, the number 3 will show in the window of the third drive 1340 (e.g., back plunger). This indicates that a third implant is in position to be deployed.

At step 3415, the back plunger 1340 is advanced until it stops a second time.

Advancing the back plunger extrudes the third implant out of the needle.

At step 3420, the closure handle assembly is squeezed to fully deploy implant number 3 (e.g., third braided suture segment 1520). Squeezing the closure handle assembly forces the compensator out of the needle. The compensator prevents the needle from cutting or damaging the suture or the braided suture segment.

At step 3425, the suture is pulled to form a third loop. The third braided suture segment is formed into a third suture loop track 1530 that prevents the braided suture segment from being pulled back through the tissue.

At step 3430, the closure handle assembly is relaxed a third time.

At step 3435, the needle is removed from the tissue a third time.

At step 3440, the closure handle assembly is squeezed to re-engage the compensator.

At step 3445, the suture is pulled to tighten the third suture loop track 1530 against the distal tissue surface.

At step 3450, it is determined if another anchor is to be deployed. If it is determined that another anchor is to be deployed, then the process moves to step 3395. If it is determined that another anchor is not to be deployed, then the process moves to step 3455.

At step 3455, the flexible strand is secured to keep the tissue fixated by the braided suture segment.

At step 3460, the flexible strand (e.g., suture) is cut.

FIG. 34A shows an embodiment of a needle tip 1410 of a needle 1328 piercing a tissue 1420 in accordance with the present disclosure.

FIG. 34B shows an embodiment of an implant 3410 being advanced from a needle tip 1410 by squeezing a closure handle assembly of a closure device in accordance with the present disclosure.

FIG. 34C shows an embodiment of exposing a compensator 1312 from a needle tip 1410 by squeezing the closure handle assembly of a closure device a second time and holding it closed in accordance with the present disclosure.

FIG. 34D shows an embodiment of pulling a suture 1322 taut and deforming the implant 3410 by continuing to hold the closure handle assembly closed.

FIG. 34E shows an embodiment of removing the needle 1485 from the tissue 1420 by relaxing the closure handle assembly and having the compensator 1312 retract into the needle 1485.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A surgical device for implanting a flexible braided anchor assembly for tissue fixation, comprising:
    a closure handle assembly comprising:
        a first loop;
        a second loop; and
        a drive;
    a cylindrical bore passing through the closure handle assembly on a center axis along a length of the closure handle assembly;
    a peek outer tube positioned in the cylindrical bore of the closure handle assembly, the peek outer tube being hollow and having a common center line with the cylindrical bore of the closure handle assembly, the peek outer tube comprising a delivery needle having a needle tip at a distal end of the peek outer tube;
    a plurality of braided suture segments slidably coupled to a flexible strand, the flexible strand being translationally threaded through plurality of braided suture segments;
    a nitinol inner tube positioned in the peek outer tube and having a common center line with the peek outer tube, the nitinol inner tube configured to extrude a first braided suture segment; and
    an inner drive tube positioned in the nitinol inner tube and having a common center line with the nitinol inner tube, the inner drive tube configured to extrude remaining braided suture segments of the plurality of braided suture segments, wherein the remaining braided suture segments of the plurality of braided suture segments are translationally threaded through and pressure fit within a detent in the inner drive tube.

2. The surgical device of claim 1, wherein each of plurality of braided suture segments comprises a hollow braided suture segment.

3. The surgical device of claim 2, wherein each of the braided suture segments of the plurality of braided suture segments has a length of between about 5 mm and about 12 mm.

4. The surgical device of claim 1, wherein:
    the flexible strand comprises a monofilament strand; and
    the plurality of braided suture segments comprises a plurality of hollow braided suture segments aligned end to end having the monofilament strand threaded through the aligned plurality of hollow braided suture segments.

5. The surgical device of claim 1, wherein a column strength of the plurality of hollow braided suture segments is increased by application of at least one of heat or a cyanoacrylate coating to each of the segments of the plurality of hollow braided suture segments.

6. The surgical device of claim 5, wherein a distal end of the flexible strand threaded through a first braided suture segment is looped around the first braided suture segment and knotted around the flexible strand between the first braided suture segment and the first drive tube.

7. The surgical device of claim 1, wherein a braided suture segment of the plurality of braided suture segments has a length of between about 5 mm and about 50 mm.

8. The surgical device of claim 1, wherein each of the plurality of braided suture segments is treated with a treatment to increase a rigidity of the plurality of braided suture segments slidably coupled to the flexible strand.

9. The surgical device of claim 8, wherein the treatment comprises:
    heating each of the plurality of braided suture segments; or
    applying a cyanoacrylate coating to each of the plurality of braided suture segments.

* * * * *